(12) United States Patent
Inoue et al.

(10) Patent No.: US 8,089,847 B2
(45) Date of Patent: Jan. 3, 2012

(54) RECORDING AND REPRODUCING APPARATUS

(75) Inventors: Shohei Inoue, Fukuoka (JP); Syougo Horinouchi, Fukuoka (JP); Hideaki Horio, Fukuoka (JP); Taiichi Mori, Fukuoka (JP)

(73) Assignee: Panasonic Corporation, Osaka (JP)

( * ) Notice: Subject to any disclaimer, the term of this patent is extended or adjusted under 35 U.S.C. 154(b) by 115 days.

(21) Appl. No.: 12/550,366

(22) Filed: Aug. 29, 2009

(65) Prior Publication Data

US 2010/0054107 A1 Mar. 4, 2010

(30) Foreign Application Priority Data

| Aug. 29, 2008 | (JP) | ................................. 2008-221387 |
| Aug. 29, 2008 | (JP) | ................................. 2008-221390 |
| Aug. 29, 2008 | (JP) | ................................. 2008-221391 |
| Aug. 29, 2008 | (JP) | ................................. 2008-221395 |
| Aug. 29, 2008 | (JP) | ................................. 2008-221396 |
| Aug. 29, 2008 | (JP) | ................................. 2008-221398 |

(51) Int. Cl.
*G11B 7/00* (2006.01)

(52) U.S. Cl. .................................... 369/103; 369/112.22

(58) Field of Classification Search .................... None
See application file for complete search history.

(56) References Cited

U.S. PATENT DOCUMENTS

| 6,600,714 | B2 * | 7/2003 | Ichimura et al. ............ 369/275.1 |
| 6,788,637 | B1 * | 9/2004 | Dang et al. ................ 369/112.23 |
| 7,457,016 | B2 | 11/2008 | Roh | |
| 2001/0014061 | A1 * | 8/2001 | Ueyanagi .................... 369/44.23 |
| 2002/0071145 | A1 | 6/2002 | Roh | |
| 2006/0280095 | A1 * | 12/2006 | Tsukagoshi et al. .......... 369/103 |

FOREIGN PATENT DOCUMENTS

JP 2002-150567 5/2002

\* cited by examiner

*Primary Examiner* — Joseph Haley
(74) *Attorney, Agent, or Firm* — Dickinson Wright PLLC

(57) ABSTRACT

The recording and reproducing apparatus has rotary drive unit (a motor) that rotationally drives a multilayer recordable recording medium 1; a reference-light-side recording and reproducing lens 6 and a recording-light-side recording and reproducing lens 7 that are disposed oppositely to the recording medium 1 which is rotationally driven by the rotary drive unit, an address detection lens 5 that is disposed opposite the recording medium 1 and that is provided separately from the recording and reproducing lenses 6 and 7; a light source 9 for recording and reproducing purpose that supplies recording reproduction light to the recording and reproducing lenses 6 and 7; and the address light source 9 that supplies address light to the address detection lens 5. The apparatus is configured in such a way that light whose center axis portion is optically hollow is supplied from the reference-light-side recording and reproducing lens 6 to the recording medium 1 during reproducing operation.

16 Claims, 15 Drawing Sheets

RECORDING AND REPRODUCING APPARATUS

BACKGROUND

1. Field of the Invention

The present invention relates to a recording and reproducing (hereinafter called "recording reproduction") apparatus that records and reproduces data on and from a multilayer recordable recording medium.

2. Description of the Related Art

Multilayer recordable recording mediums have recently been put forward in order to enhance recording capacity.

A recording reproduction apparatus that subjects a recording medium to multilayer recording is configured as follows.

Specifically, a related-art recording reproduction apparatus is made up of a rotary drive unit that rotationally drives a multilayer recordable recording medium; a lens disposed opposite the recording medium rotationally driven by the rotary drive unit; and a recording reproduction light source for feeding recording reproduction light to the lens; and an address light source for feeding address light to the lens. Patent Document 1 provided below is available as a document including descriptions about a technique relevant to a related-art recording reproduction apparatus.

Patent Document 1: JP-A-2002-150567

In the related-art recording reproduction apparatus, reproduction of a multilayer record does not become stable.

Namely, in order to record information in multiple layers in a recording medium, the lens is made up of a reference-light-side recording reproduction lens and a recording-light-side recording reproduction lens, which are opposed each other with a recording medium interposed therebetween. During recording, recording operation is performed by emitting a reference light beam from the reference-light-side recording reproduction lens to the inside of a recording medium and emitting a recording light beam from the recording-light-side recording reproduction lens to the inside of the recording medium, to thus generate interference fringes at a point of intersection between the light beams.

Next, during reproduction, recorded data are reproduced by emitting the reference light beam toward an object recording layer by way of the reference-light-side recording reproduction lens, to thus reflect the light by unit of interference fringes of the recording layer, and feeding the reflected light beam to a light receiving element by way of the reference-light-side recording reproduction lens.

Provided that the object recording layer is an interior layer; for instance, the $50^{th}$ interior layer, $1^{st}$ to $49^{th}$ interference fringes are present in front of the objective recording layer. Therefore, during reproduction, light beams reflected from the $1^{st}$ to $49^{th}$ interference fringes located in front of the object recording layer are mixed as noise into a light beam reflected from the $50^{th}$ layer, as a result of which reproduction of the multilayer record often becomes unstable.

SUMMARY

Accordingly, the present invention aims at making reproduction of the multilayer record stable.

In order to achieve the objective, the present invention provides a recording and reproducing apparatus comprising: a rotary drive unit that rotationally drives a multilayer recordable recording medium; a recording and reproducing lens that is disposed oppositely to the recording medium which is rotationally driven by the rotary drive unit; a light source for recording and reproducing purpose that supplies recording and reproducing light to the recording and reproducing lens; and a filter supplying light that is supplied from the recording and reproducing lens to the recording medium during reproducing operation, a center portion of the light being blocked. The initial objective is achieved by means of the apparatus.

As mentioned above, in order to achieve the objective, the present invention is directed toward a recording and reproducing apparatus comprising rotary drive unit that rotationally drives a multilayer recordable recording medium; recording and reproducing lenses that are disposed oppositely to the recording medium that is rotationally driven by the rotary drive unit, a light source for recording and reproducing purpose that supplies recording and reproducing light to the recording and reproducing lenses; and a filter for supplying light that is supplied from the recording and reproducing lenses to the recording medium during reproducing operation and that has a blocked center portion. Hence, reproduction of information recorded in layers can be made stable.

Specifically, during reproducing operation, light whose center axis portion is optically hollow is supplied to the recording medium from the reference-light-side recording and reproducing lens. Hence, if a target recording layer is an interior layer; for instance, the $50^{th}$ layer, the amount of reflection from interference fringes of the first through $49^{th}$ layers becomes considerably small even when interference fringes are present in the first through $49^{th}$ layers located before the $50^{th}$ layer. Therefore, even if the reflected light is mixed into the light reflected from the target $50^{th}$ layer, resultant noise does not hinder reproducing operation. As a consequence, reproduction of information recorded in layers becomes stable.

DETAILED DESCRIPTION

An embodiment of the present invention will be described herein by reference to the accompanying drawings.

Embodiment

Figure 1:
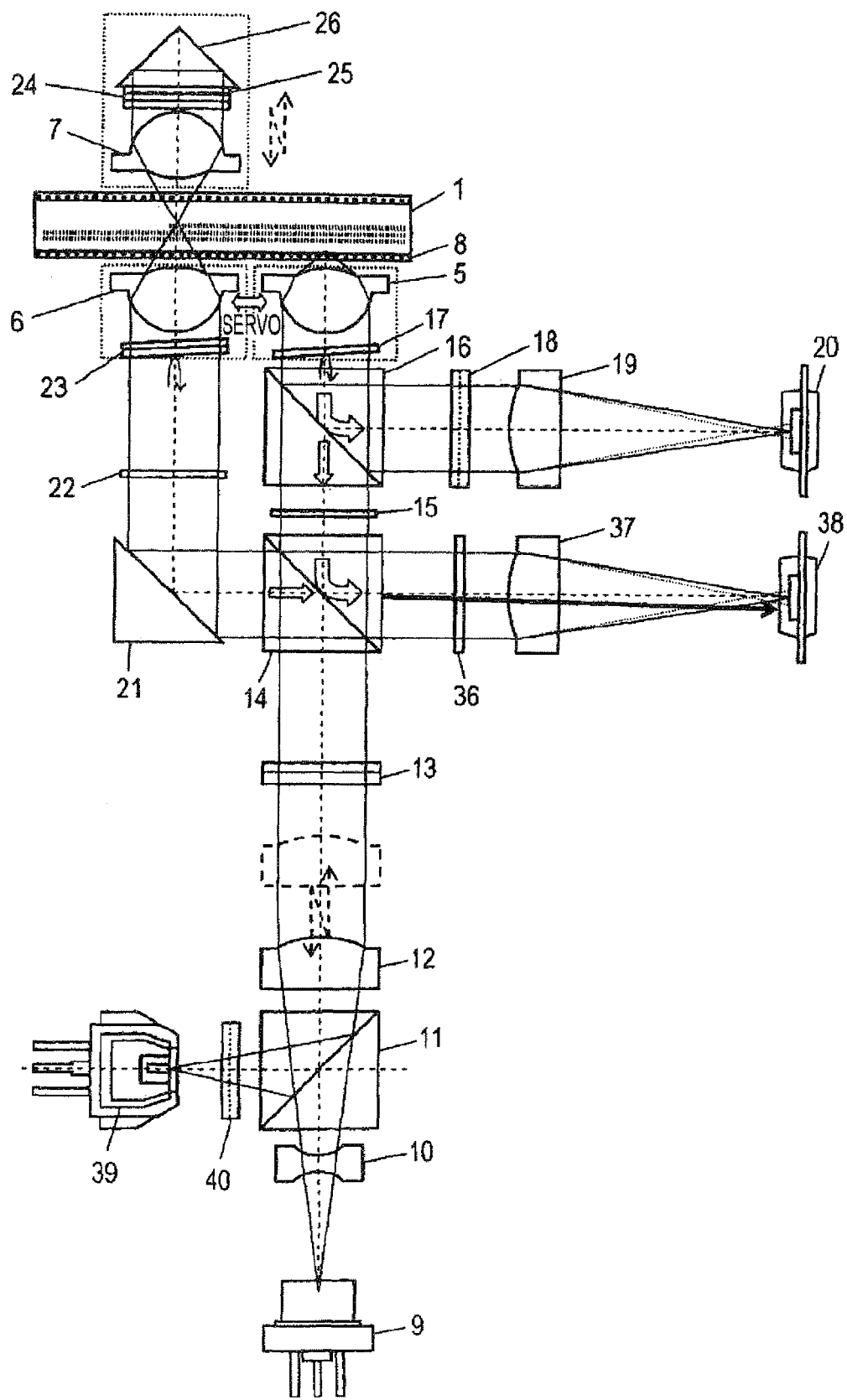
FIG. 1 is a block diagram showing a recording and reproducing apparatus of an embodiment of the present invention.

FIG. 1 shows a recording reproduction apparatus of an embodiment of the present invention. In FIG. 1, reference numeral 1 designates a multilayer recordable recording medium made of; for instance, photopolymer. As shown in FIG. 3A, the recording medium on the whole assumes the shape of a disc, and a through hole (designated by reference numeral 2 of FIG. 3A) is provided in the center of the recording medium.

A rotary drive shaft 4 of a motor 3 is inserted into the through hole 2. Although un-illustrated, the rotary drive shaft is chucked in this state, whereby the recording medium 1 is rotationally driven by the motor 3 via the rotary drive shaft 4.

Specifically, rotary drive unit is made up of the motor 3 and the rotary drive shaft 4.

Turning back to FIG. 1, descriptions are continually provided. As shown in FIG. 1, an address detection lens 5 and a recording reproduction lens 6 are arranged opposite and side by side on one surface side (e.g., a lower surface side) of the recording medium 1.

As a matter of course, the address detection lens 5 and the record reproduction lens 6 are separate elements and independent of each other. The address detection lens 5 is configured appropriate for detecting an address, and the recording reproduction lens 6 is configured appropriately for multilayer reproduction and recording operations.

Further, a recording reproduction lens 7 is disposed on the other side (e.g., an upper side) of the recording medium 1 so as to oppose the recording reproduction lens 6 by way of the recording medium 1.

An area including the address detection lens 5, the recording reproduction lens 6, and the recording reproduction lens 7 is now described by reference to FIG. 2.

Figure 2:
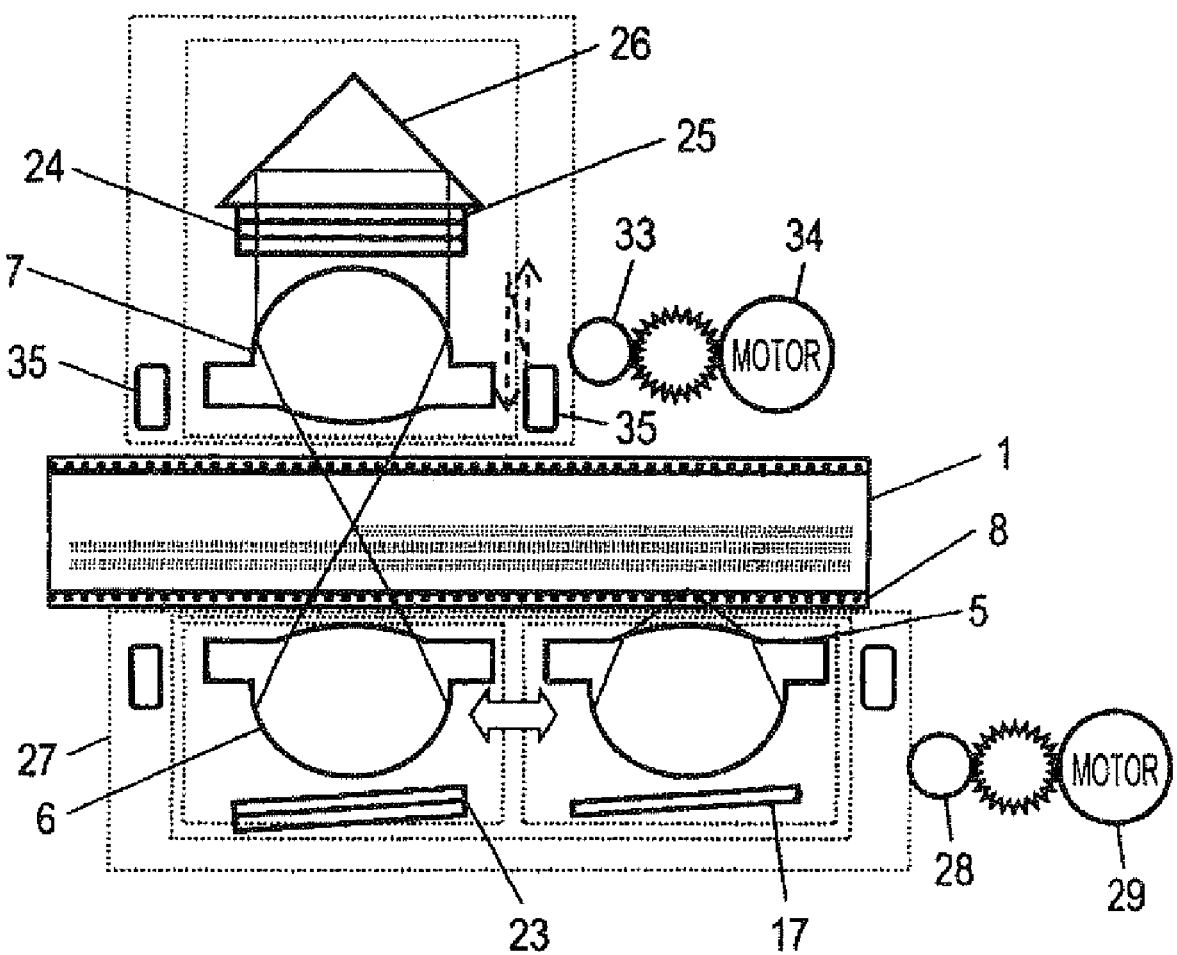
FIG. 2 is an enlarged view of the same principal portion.

First, as shown in FIG. 2, the recording medium 1 can enable multilayer recording in its thicknesswise direction. As shown in FIG. 2, interference fringes are generated by interference of light arising at a point of intersection of light beams from the recording reproduction lenses 6 and 7. The interference fringes are recorded as changes in a characteristic of a medium material, such as changes in refractive index, and constitute a portion of a digital signal. Of the recording reproduction lenses 6 and 7, the recording reproduction lens 6 is a lens for emitting reference light into the recording medium 1, and the recording reproduction lens 7 is a lens for emitting light reflected by a retro-reflector 26, which will be described below, as recording light into the recording medium 1.

An interference fringe is intermittently generated within a single plane (the inside of an interior layer) of the recording medium 1 on which the interference fringe is generated as mentioned above, whereby a video and audio are recorded as a digital signal.

As is obvious from FIG. 2, the point of intersection of the light beams from the recording reproduction lenses 6 and 7 is moved to a plurality of recording planes in the thicknesswise direction of the recording medium 1, whereby the video and audio are recorded as a digital signal in a single plane over which the point of intersection is moved. The recording plane can be generated in a plurality of layers with respect to the thicknesswise direction of the recording medium 1. Therefore, recording capacity of the recording medium 1 can be made considerably large.

For instance, in a case where information about a surveillance camera is recorded in the recording medium 1, it is also possible to record security information for one year in one recording medium 1. A potential of a considerable increase in recording capacity of the recording medium 1 will therefore be understood.

The address detection lens 5 is provided for performing recording operation and subsequent reproducing operation by use of the recording reproduction lenses 6 and 7.

As shown in FIG. 2, the address detection lens 5 is for reading an address 8 provided on a lower surface of the recording medium 1. By use of the thus-read address 8, multilayer recording operation and subsequent reproducing operation performed by use of the recording reproduction lenses 6 and 7 are carried out.

A position where the address detection lens 5 can have appropriately read the address 8 of the recording medium 1 acts as a reference position for the address detection lens 5. The position of the recording reproduction lens 6 is controlled according to the reference position.

The reason why the address detection lens 5 that fulfills such a role is provided as a separate element independently of the recording reproduction lens 6 is for appropriately reading the address 8 provided on the lower surface of the recording medium 1.

Specifically, when the address 8 is broken into pieces in order to increase recording density, it is possible to readily enhance operation reliability by providing the address detection lens 5, which is specifically designed for reading an address, to read the thus-fragmented address 8 of the recording medium 1. Since the recording medium 1 is subjected to recording and reproducing in accordance with the thus-fragmented address information, recording density is enhanced, and an attempt can be made to greatly increase capacity.

The recording reproduction apparatus is configured in such a way that recording reproduction light is fed to the recording medium 1 by way of the recording reproduction lenses 6 and 7 and that address light is fed to the recording medium 1 by way of the address detection lens 5. Therefore, the recording reproduction light and the address light hardly cause interference within the recording medium 1. Detection of an address by way of the address detection lens 5 and operation for subjecting the recording medium to recording and reproducing by way of the recording reproduction lenses 6 and 7 consequently become stable.

Turning back to FIG. 1, descriptions about the light source, and the like, for recording operation and subsequent reproducing operation by use of the recording reproduction lenses 6 and 7 and reading an address by use of the address detection lens 5 are now continually provided.

In the present embodiment, recording and subsequent reproduction of information in and from the recording medium 1 and reading the address 8 by use of the address detection lens 5 are performed by a single light source 9.

Specifically, a laser that emits blue light having a wavelength of 405 nm is used as the light source 9 in the present embodiment.

The blue light from the light source 9 first undergoes correction on a relay lens 10 in order to expand a diameter and achieve complete roundness. The light then passes through a beam splitter 11 and is transformed into collimated light by a collimator lens 12. A half wavelength plate 13 then converts the collimated light into light having two mutually orthogonal polarized light components (P-polarized light and S-polarized light).

Of the thus-converted polarized light, the P-polarized light passes through a beam splitter 14; subsequently passes through a quarter wavelength plate 15, a beam splitter 16, and a quarter wavelength plate 17 one after another; further passes through the address detection lens 5; and is converged to the address 8.

Light reflected from the address 8 as a result of exposure of the address 8 on the recording medium 1 is detected as address information. After passing through the address detection lens 5 and the quarter wavelength plate 17, the reflected light enters the beam splitter 16 and then undergoes 90-degree reflection on the beam splitter 16. Subsequently, the reflected light passes through a hologram 18 and then undergoes convergence on an astigmatic lens 19. The thus-converged light then arrives at an address detection element 20.

Address information is detected by virtue of the information arrived at the address detection element 20. In accordance with the address information, multilayer recording and subsequent reproduction, which are performed by way of the recording reproduction lenses 6 and 7, are carried out.

By virtue of the information arrived at the address detection element 20, focal information about the address detection lens 5 corresponding to the address 8 on the recording medium 1 is also detected. Specifically, the position of the address detection lens 5 is adjusted in such a way that the light arrived at the address detection element 20 comes into a focus on the address detection element 20. The positions of the recording reproduction lenses 6 and 7 are controlled by taking the position as a reference position.

The beam splitter 16 that reflects the light reflected from the recording medium 1 toward the address detection element 20 will be described further in detail.

The beam splitter 16 is for separating light from the polarized components of light according to the direction of rotation of circularly polarized light. In particular, counterclockwise polarized light passes through the beam splitter 16, and clockwise polarized light is reflected by the beam splitter 16 in the present embodiment (the beam splitter 16 is configured so as not to reflect light from a light source 39 to be described later).

Specifically, the P-polarized light originated from the light source 9 and passed through the beam splitter 14 passes through the quarter wavelength plate 15, to thus turn into counterclockwise polarized light and pass through the beam splitter 16.

The counterclockwise polarized light passed through the beam splitter 16 passes through the quarter wavelength plate 17, to thus turn into S-polarized light. The S-polarized light passes through the address detection lens 5 and undergoes convergence, to thus turn into address light. The address light is radiated onto the address 8 of the recording medium 1 and then undergoes reflection on the address 8.

After passing through the address detection lens 5, S-polarized light reflected from the recording medium 1 passes through the quarter wavelength plate 17, to thus turn into clockwise polarized light. The reflected light from the recording medium 1, which has turned into the clockwise polarized light, enters the beam splitter 16 and undergoes 90-degree reflection on the beam splitter 16, thereby traveling toward the address detection element 20.

As mentioned above, in the present embodiment, the P-polarized light, which is linearly polarized light and which has originated from the light source 9 and has been separated by the beam splitter 14, is caused to pass through the quarter wavelength plate 15 by use of the beam splitter 16 that separates light according to the direction of rotation of circularly polarized light, to thus turn into circularly polarized light. The circularly polarized light is further caused to pass through the quarter wavelength plate 17 twice, to thus turn into circularly polarized light that rotates in a direction opposite to the rotating direction of the polarized light achieved when the polarized light has passed through the quarter wavelength plate 15. Thus, the traveling direction of the circularly polarized light can be changed.

Namely, the beam splitter 16 that separates light by unit of rotating direction of the circularly polarized light is used along with the quarter wavelength plates 15 and 17, whereby a traveling direction of light can be changed even when the light is linearly polarized light having a single wavelength.

As mentioned above, in the present embodiment, the multilayer recording and subsequent reproducing operation, which are performed by unit of the recording reproduction lenses 6 and 7, are performed in accordance with the address information detected by the address element detection element 20 and the focal information about the address detection lens 5 corresponding to the address 8 on the recording medium 1.

Specifically, the beam splitter 14 reflects the S-polarized light passed through the half wavelength plate 13 at right angles in a leftward direction of FIG. 1. The thus-reflected light again undergoes reflection at right angles on a mirror 21, thereby passing through a quarter wavelength plate 22 and a spherical aberration correction element 23 one by one. Subsequently, the light is focused on the recording medium 1 by unit of the recording reproduction lens 6. After having spread from the focal point, the light is again transformed into collimated light by unit of the recording reproduction lens 7.

The collimated light converted by the recording reproduction lens 7 then passes through the spherical aberration correction element 24 and a shutter 25 and then travels to the retro-reflector 26, where the light undergoes reflection. Subsequently, the reflected light passes through the shutter 25 and the spherical aberration correction element 24 and is then focused by the recording reproduction lens 7. As shown in FIGS. 1 and 2, the light comes into a focus in the recording medium 1.

At this time, the recording reproduction lens 6 has already come into a focus on a set recording plane in the recording medium 1, so that the focal point interferes with the focal point generated by the recording reproduction lens 7. As mentioned above, an interference fringe is consequently generated in the recording medium 1.

A drive system for the address detection lens 5, the recording reproduction lens 6, and the recording reproduction lens 7 is now described.

Specifically, in order to appropriately read the address 8 on the recording medium 1, the address detection lens 5 must regulate a focal length to the recording medium 1. Moreover, the recording reproduction lenses 6 and 7 are required to make their focal points at locations set on the recording plane. Further, the recording reproduction lenses 6 and 7 must perform multilayer recording in the thicknesswise direction of the recording medium 1. Hence, drive control of the recording reproduction lenses becomes important.

Prior to explanation of drive control, the address detection element 20 is arranged so as to determine the nature of the focal point of the address detection lens 5 corresponding to the address 8 on the recording medium 1, depending on the manner in which the information from the address 8 on the recording medium 1 is fed by way of the astigmatic lens 19. In order to match the focal point of the address detection lens 5 to the address 8 on the recording medium 1, an adjustment, such as that mentioned below, is performed.

The recording reproduction lens 6 and the address detection lens 5 are first housed in a frame 27, to thus be combined into a unit, as will be understood from FIGS. 2 and 3B. The frame 27 is supported by screw shafts 28 shown in FIG. 3A.

The screw shafts 28 are driven by a motor 29 shown in FIG. 2, whereby the recording reproduction lens 6 and the address detection lens 5 are moved in a radial direction of the recording medium 1, as shown in FIG. 3A. The quarter wavelength plate 17 is held on the frame 27 while being spaced a given interval apart from the address detection lens 5, and the spherical aberration correction element 23 is held on the frame 27 while being separated at a given interval apart from the recording reproduction lens 6. Therefore, in the present embodiment, information about the position of the address detection lens 5 and the position of the recording reproduction lens 6 with respect to the recording medium 1 is acquired by utilization of the quarter wavelength plate 17 and the spherical aberration correction element 23.

In the present embodiment, the address detection lens 5 and the recording reproduction lens 6 are held on the frame 27 while respectively arranged side by side at an upstream position and a downstream position on track-shaped addresses of the recording medium 1. However, in some occasions, the address detection lens 5 and the recording reproduction lens 6 are often held on the frame 27 while arranged side by side along a radial direction of the recording medium 1.

As mentioned above, in the present embodiment, frame drive unit for moving the frame 27 in the radial direction of the recording medium 1 is made up of the frame 27, the screw shafts 28, and the motor 29. Hence, by moving only the frame 27, the address detection lens 5 and the recording reproduction lens 6 can also be integrally moved. Therefore, quick operation is attained, and the relationship between the address detection lens 5 and the recording reproduction lens 6 can be readily maintained constant.

When the recording reproduction lens 6 is adjusted by means of taking address information as a reference, the amount of adjustment can be reduced, as a result of which operation becomes faster and stability is enhanced.

Further, in the present embodiment, the address detection lens 5 is positioned upstream of the recording reproduction lens 6 within the frame 27 with respect to the rotating direction of the recording medium 1.

An electromagnetic coil 30 for adjusting the distance between the address detection lens 5, the recording reproduction lens 6, and the recording medium 1 in this state is provided at each of four corners of the frame 27.

Specifically, the electromagnetic coils 30 serve as lens distance adjustment unit for adjusting the distance from the recording medium 1 to the address detection lens 5 and the recording reproduction lens 6.

Even at that time, the address detection lens 5 and the recording reproduction lens 6 are combined in a unit on the frame 27, whereby the address detection lens 5 and the recording reproduction lens 6 can stably be adjusted with respect to the recording medium 1 in a short period of time.

In order to finely adjust the distance from the address detection lens 5 to the recording medium 1 and the distance from the recording reproduction lens 6 to the recording medium 1, the electromagnetic coils 31 are provided at four corners of the address detection lens 5, and electromagnetic coils 32 are provided at four corners of the recording reproduction lens 6.

Specifically, the electromagnetic coils 31 serve as lens distance adjustment unit for adjusting the distance between the recording medium 1 and the address detection lens 57 and the electromagnetic coils 32 serve as lens distance adjustment unit for adjusting the distance between the recording medium 1 and the recording reproduction lens 6.

The address detection lens 5 and the recording reproduction lens 6 are arranged in a well-balanced manner within the frame 27. This also makes movement of the frame 27 smooth and also enhances stability against vibrations.

Meanwhile, as will be understood from FIGS. 2 and 37 the recording reproduction lens 7 located above the recording medium 1 is actuated in the radial direction of the recording medium 1 by driving the screw shafts 33 through use of a motor 34. The screw shafts 33 and the motor 34 constitute drive unit for driving the recording reproduction lens 7 in the radial direction of the recording medium 1.

Electromagnetic coils 35 are provided for adjusting the distance between the recording medium 1 and the recording reproduction lens 7, and the electromagnetic coils 35 constitute lens distance adjustment unit.

The recording reproduction lens 6 and the address detection lens 5 in the frame 27 each are equipped with lens position correction unit for adjusting their positions within the frame 27.

Specifically, as shown in FIG. 3B, the recording reproduction lens 6 and the address detection lens 5 are provided within the frame 27. As shown in FIG. 3B, an area of the frame 27 surrounding outer regions of the recording reproduction lens 6 and the address detection lens 5 constitutes a square frame (a rectangular frame). Capacitor electrodes (not shown) are provided on respective four internally peripheral surfaces orthogonal to the square frame.

The outer edge of the recording reproduction lens 6 and the outer edge of the address detection lens 5, which are spaced apart from each other at a predetermined interval within the square frame of the frame 27, also assume a square shape. Capacitor electrodes (not shown) are provided on four outer peripheral surfaces of the respective square frames of the recording reproduction lens 6 and the address detection lens 5.

Four capacitors are fabricated on the respective outer peripheral surfaces of the recording reproduction lens 6 and on the respective outer peripheral surfaces of the address detection lens 5.

Therefore, so long as the capacitance of the capacitors on the four outer peripheral surfaces of the recording reproduction lens 6 and the capacitance of the capacitors on the four outer peripheral surfaces of the address detection lens 5 are detected, it is possible to determine a positional relationship between the recording reproduction lens 6 and the address detection lens 5 within the square frame of the frame 27.

According to the determination information, electric power is applied to un-illustrated electromagnetic coils, thereby correcting the positional relationship between the recording reproduction lens 6 and the address detection lens 5 within the square frame of the frame 27. In short, capacitor electrodes (not shown) and electromagnetic coils (not shown) provided for this area constitute the lens position correction unit.

In the above configuration, when the address detection lens 5 detects the address 8, the address detection lens 5 is first actuated by the electromagnetic coils 30 and 31 in such a way that a focal point on the address detection element 20 becomes most appropriate as mentioned above, and so-called servo control is performed now, to thus read the correct address 8. A reference position is set for the address detection lens 5.

Control for causing interference between the focal points of the recording reproduction lends 6 and 7 will now be described.

The light having induced an interference fringe within the recording medium 1 passes through the recording reproduction lens 6 and subsequently through the spherical aberration correction element 23, the quarter wavelength plate 22, the mirror 21, and then the beam splitter 14. Subsequently, the light passes through the quarter wavelength plate 36, an analyzer (not shown) provided integrally with the quarter wavelength plate, and the aspheric lens 37. The light is then detected by a light receiving element 38.

The analyzer is a filter for permitting passage of linearly polarized light in one direction and is usually called a polarization filter.

In accordance with detection data from the light receiving element 38, the recording reproduction lenses 6 and 7 are subjected to servo control by use of the electromagnetic coils 31 and 35, whereby control is performed in such a way that an interference fringe appropriate for a layer of target depth in the recording medium 1 is generated.

As mentioned above, in the present embodiment, the recording reproduction apparatus is also provided with compatibility for reading and writing data from and in a so-called CD and DVD as well as compatibility with the multilayer recordable recording medium 1.

Specifically, a light source 39 capable of emitting infrared light for a CD and red light for a DVD is provided in a direction orthogonal to the relay lens 10 of the beam splitter 11 as shown in FIG. 1.

A brief explanation is given for compatibility. First, when a CD is subjected to recording or reproduction, the light source 39 emits infrared light as mentioned above. Further, when a DVD is subjected to recording or reproduction, the light source 39 emits red light as mentioned above. As a matter of course, a CD or a DVD is loaded to the rotary drive shaft 4 shown in FIG. 3A.

During these operations, the light emitted from the light source 39 then travels toward the beam splitter 11 by way of a diffraction grating 40.

Accordingly, the diffraction grating 40 is for splitting the infrared light for a CD emitted from the light source 39 into three beams and also splitting the red light for a DVD from the same into three beams, as well. By unit of splitting the light emitted from the light source 39 into beams, superior precision servo control of the recording reproduction lens 6 and enhancement of recording reproduction quality can be realized (recording and reproducing operations for a CD and a DVD will be described in detail later).

Recording and reproduction of information in and from the recording medium 1 and recording and reproduction of information in and from a CD and a DVD in place of the recording medium 1 are hereunder described.

First, recording and reproducing of data in and from the multilayer recordable recording medium 1 are now described by reference to FIGS. 4 through 6. Even in this case, positional information about the address detection lens 5 is used as a reference for the positional information about the recording reproduction lens 6. Focal points of the recording reproduction lenses 6 and 7 are controlled at all times by unit of taking the positional information about the address detection lens 5 as a reference.

Figure 4:
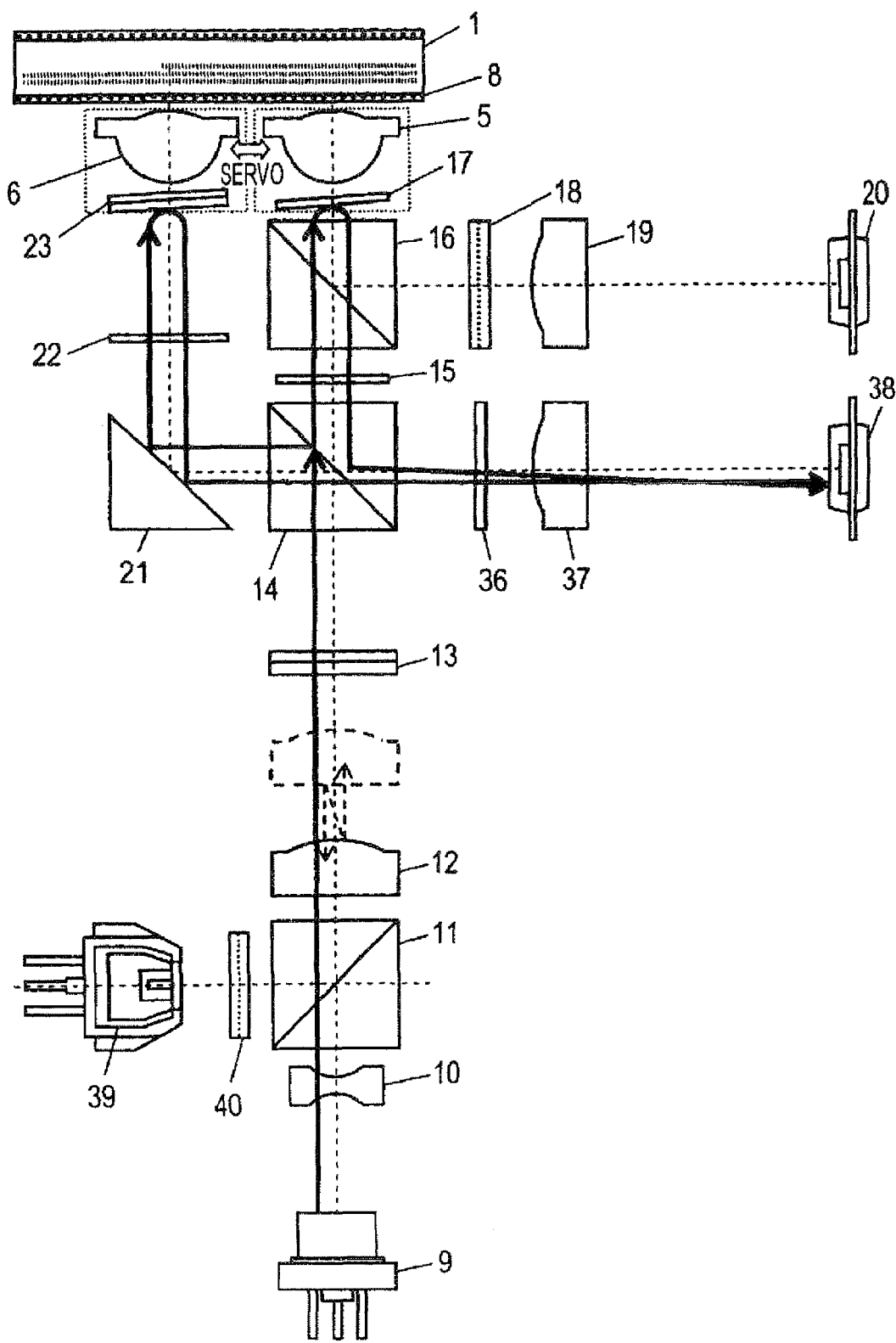
FIG. 4 is a block diagram for describing operation of the principal portion.

In this case, a target layer of the recording medium 1 to be subjected to recording or reproduction is set, and FIG. 4 shows the setting.

In FIG. 4, the P-polarized light originated from the light source 9 and entered the beam splitter 14 rectilinearly travels as mentioned above and is converted into circularly polarized light by the quarter wavelength plate 15. Subsequently, the circularly polarized light passes through the beam splitter 16 and is transformed into S polarized light by the quarter wavelength plate 17, to thus travel toward the address detection lens 5.

At this time, a portion of light undergoes reflection on the surface of the quarter wavelength plate 17. The thus-reflected light passes through the beam splitter 16 as shown in FIG. 4, to thus turn into S-polarized light in the quarter wavelength plate 15. The S-polarized light undergoes reflection on the beam splitter 14 and arrives at the light receiving element 38 by way of the quarter wavelength plate 36, an analyzer (not shown), and the astigmatic lens 37.

Meanwhile, the S-polarized light traveled from the half wavelength plate 13 to the beam splitter 14 is reflected toward the mirror 21 as shown in FIG. 4 and is subsequently converted into circularly polarized light by the quarter wavelength plate 22. The circularly polarized light then propagates to the recording reproduction lens 6 by way of the spherical aberration correction element 23 as mentioned above.

At this time, a portion of light undergoes reflection on the surface of the spherical aberration correction element 23 in the same fashion. The thus-reflected light is converted into P-polarized light by the quarter wavelength plate 22. The P-polarized light is reflected by the mirror 21, to thus arrive at the light receiving element 38 by way of the beam splitter 14, the quarter wavelength plate 36, an analyzer (not shown), and the astigmatic lens 37.

The reflected light originated from the quarter wavelength plate 17 and arrived at the light receiving element 38 and the reflected light originated from the spherical aberration correction element 23 are respectively, slightly inclined with respect to an optical axis connecting the centers of the astigmatic lens 37 and the light receiving element 38.

For this reason, a difference arises between positions on the light receiving element 38 at which the two beams of reflected light arrive. However, the two beams of light are radiated on a substantially single point. As a consequence, the two beams interfere with each other, thereby generating in the light receiving element 38 dark-and-bright fringes that change with time when a change has arisen in relative position between the recording reproduction lens 6 and the address detection lens 5.

As mentioned above, the manner of setting of a distance between the recording reproduction lens 6 and the recording medium 1 becomes considerably important for determining a target layer of the recording medium 1 to be subjected to recording or reproduction. The position of the recording reproduction lens 6 can be set by unit of counting the number of variations in light intensity attributable to changes in time-varying interference fringe of the light receiving element 38 (the position of the address detection lens 5 defines a reference point in this case).

As a matter of course, the recording reproduction lens 6 and the address detection lens 5 are combined into a single unit by use of the frame 27, as mentioned above. Even at the time of movement of the recording reproduction lens 6, the address detection lens 5 must correctly read the address 8.

Consequently, in connection with reading the address 8 by use of the address detection lens 5, the electromagnetic coils 31 are used to make a correction on a focal point, as mentioned above.

Figure 5:
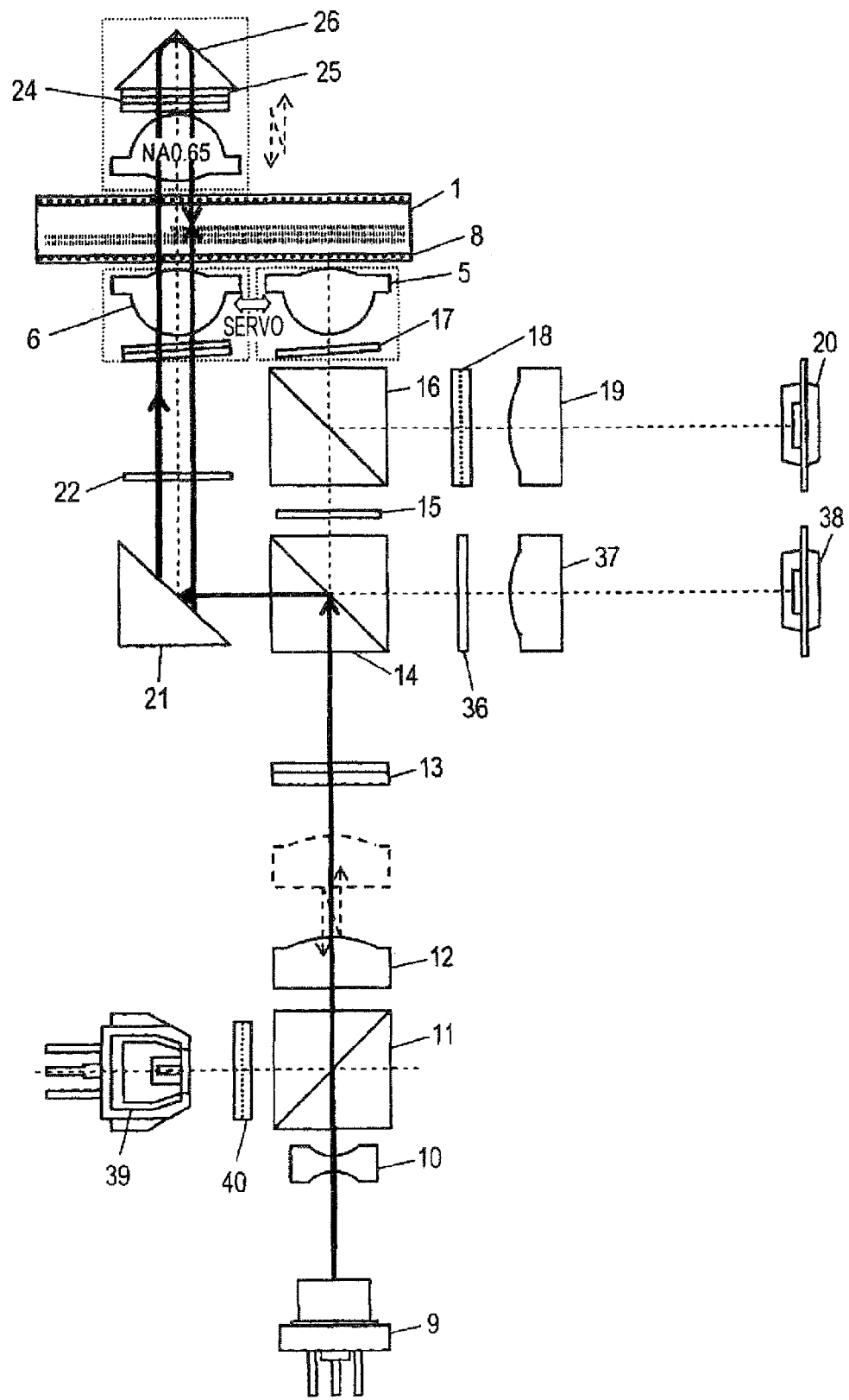
FIG. 5 is a block diagram for describing operation of the principal portion.

After a target layer of the recording medium 1 to be subjected to recording has been set, data are recorded in that layer in a state, such as that shown in FIG. 5.

In FIG. 5, in order to avoid complication of drawings, detecting an address by use of the address detection lens 5 is not described. However, as is evident from the descriptions, address detection is performed by use of light having the same wavelength as that of the light used for recording and reproducing; specifically, light from the light source 9.

Therefore, as shown in FIG. 5, information recorded in multiple layers in the recording medium 1 is very elaborate in each layer, and an attempt can be made to increase capacity commensurately.

For instance, when information supplied to the light source 9 is for security purpose; specifically, when the information is a video from a surveillance camera, security information for one year can be recorded in one recording medium 1. The present invention can greatly contribute to fulfillment of a recent demand for enhanced security.

Specifically, frequent replacement of a recording medium poses a great hindrance in security using such a surveillance camera. However, so long as elaborate information recording, such as that described in connection with the present embodiment, is performed, security information for one year can be recorded in a single recording medium 1 as mentioned above. Hence, complicatedness due to frequent replacement is resolved, which in turn greatly contributes to widespread use of the security system.

In the present embodiment, one light source is shared between address detection and recording/reproducing operation. However, address detection can also be performed by use of one light source, and recording/reproducing operation can also be performed by use of another light source.

However, even when address detection and recording/reproducing operation are performed by use of separate light sources, it is preferable to make the wavelength of the address light source equal to or shorter than the wavelength of the recording reproduction light source.

In order to perform elaborate recording and reproducing of information, address information that is equal to or greater than the information in terms of elaborateness is required. Elaborate recording and reproducing of information cannot be performed without such address information. Accordingly, it is desirable that the wavelength of the address light source should be made equal to or shorter than the wavelength of the recording reproduction light source.

Figure 6:
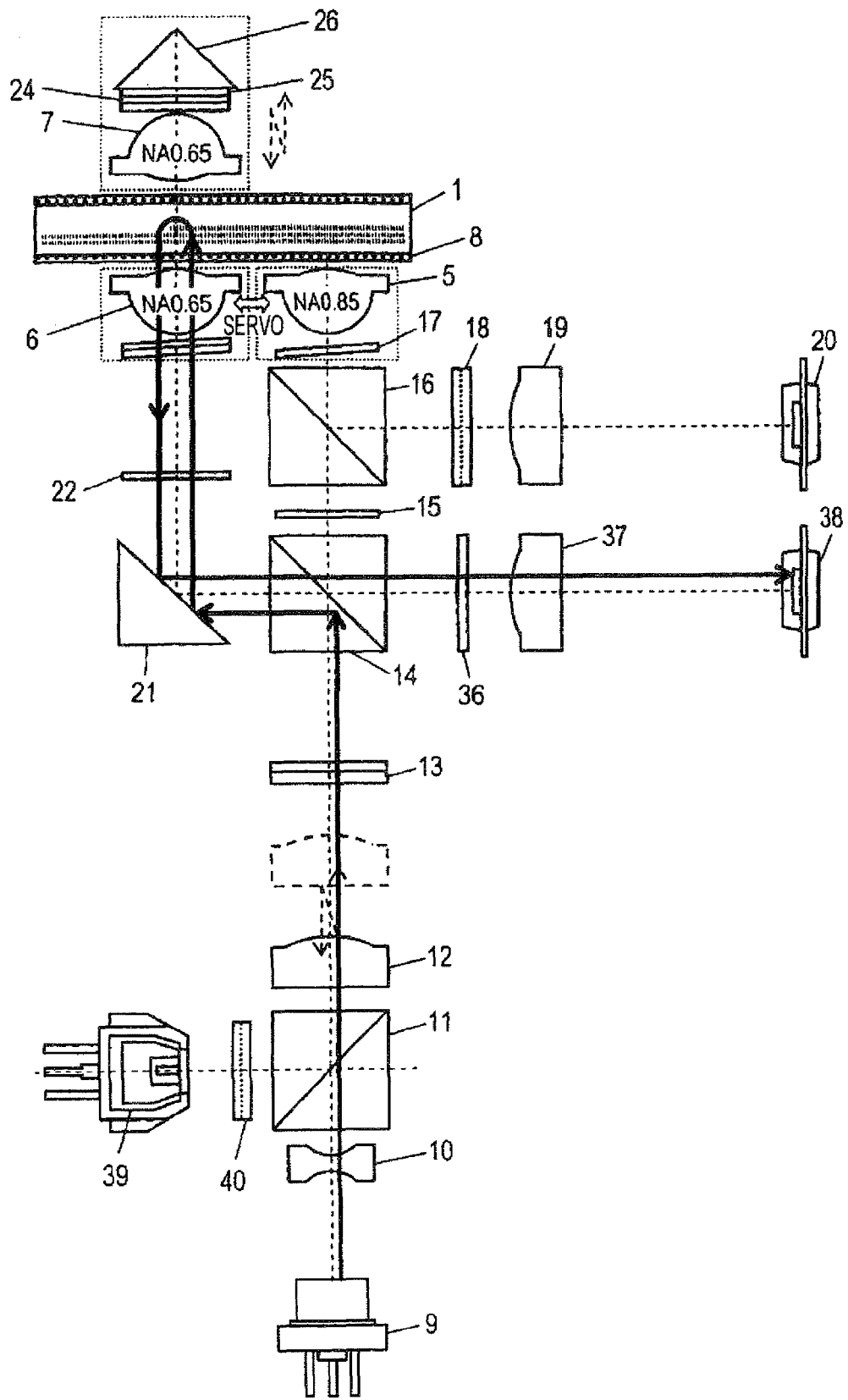
FIG. 6 is a block diagram for describing operation of the principal portion.

FIG. 6 is a view showing reading of information multilayer-recorded in the recording medium 1. At this time, reflected light is prevented from returning to the light receiving element 38 by way of the recording reproduction lens 7.

Specifically, the shutter 25 placed in front of the retro-reflector 26 is closed during reproducing operation, to thus prevent return of reflected light by way of the recording reproduction lens 7. Noise components are thereby prevented from being mixed in reproduced data.

In addition to the method for closing the shutter 25, the recording reproduction lens 7 placed at a position above the recording medium 1 is moved to a location where the lens 7 does not oppose the recording reproduction lens 6, by actuating the screw shafts 33 described in connection with FIGS. 2 and 3 through use of the motor 34, thereby making it also possible to prevent the reflected light from returning by way of the recording reproduction lens 7.

In short, so long as the position of the recording reproduction lens 6 and the position of the recording reproduction lens 7 are displaced from each other with respect to the radial direction of the recording medium 1, return of reflected light, which would otherwise arise by way of the recording reproduction lens 7, is prevented without provision of the shutter 25, so that mixing of noise components into reproduced data can be inhibited.

Figure 7:
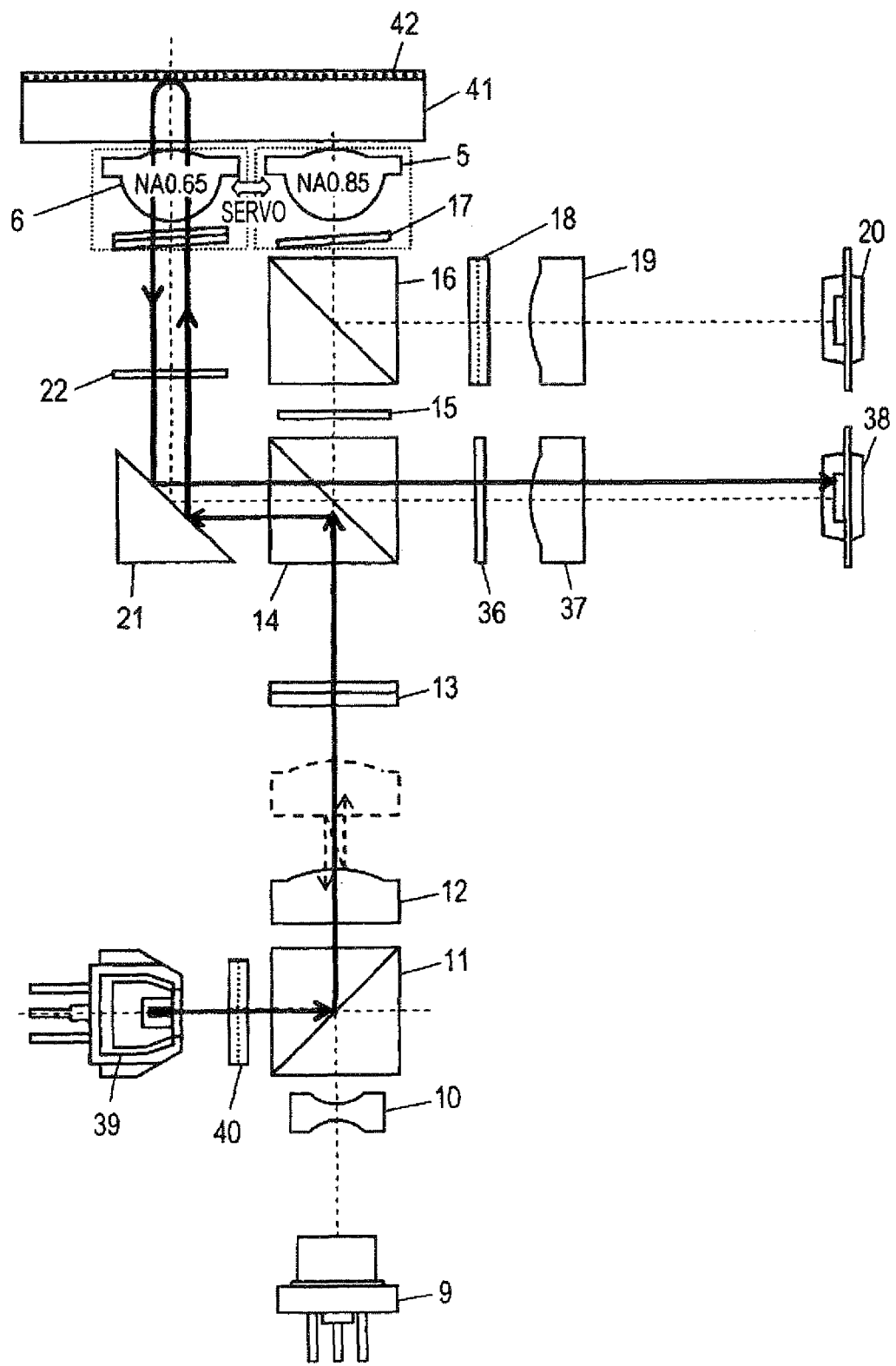
FIG. 7 is a block diagram for describing operation of the principal portion.

FIG. 7 shows that a CD 41 in place of the recording medium 1 is attached to the rotary drive shaft 4, and recording or reproduction can be performed in this state.

Since the amount of information included in the CD 41 is not so much at this time, infrared light (785 nm) is emitted from the light source 39. The thus-emitted light travels along arrowheaded paths shown in FIG. 7, thereby writing data 42 in a recording plane provided in the vicinity of an upper surface of the CD 41 in its thicknesswise direction or reading data 42 from the recording plane.

Figure 8:
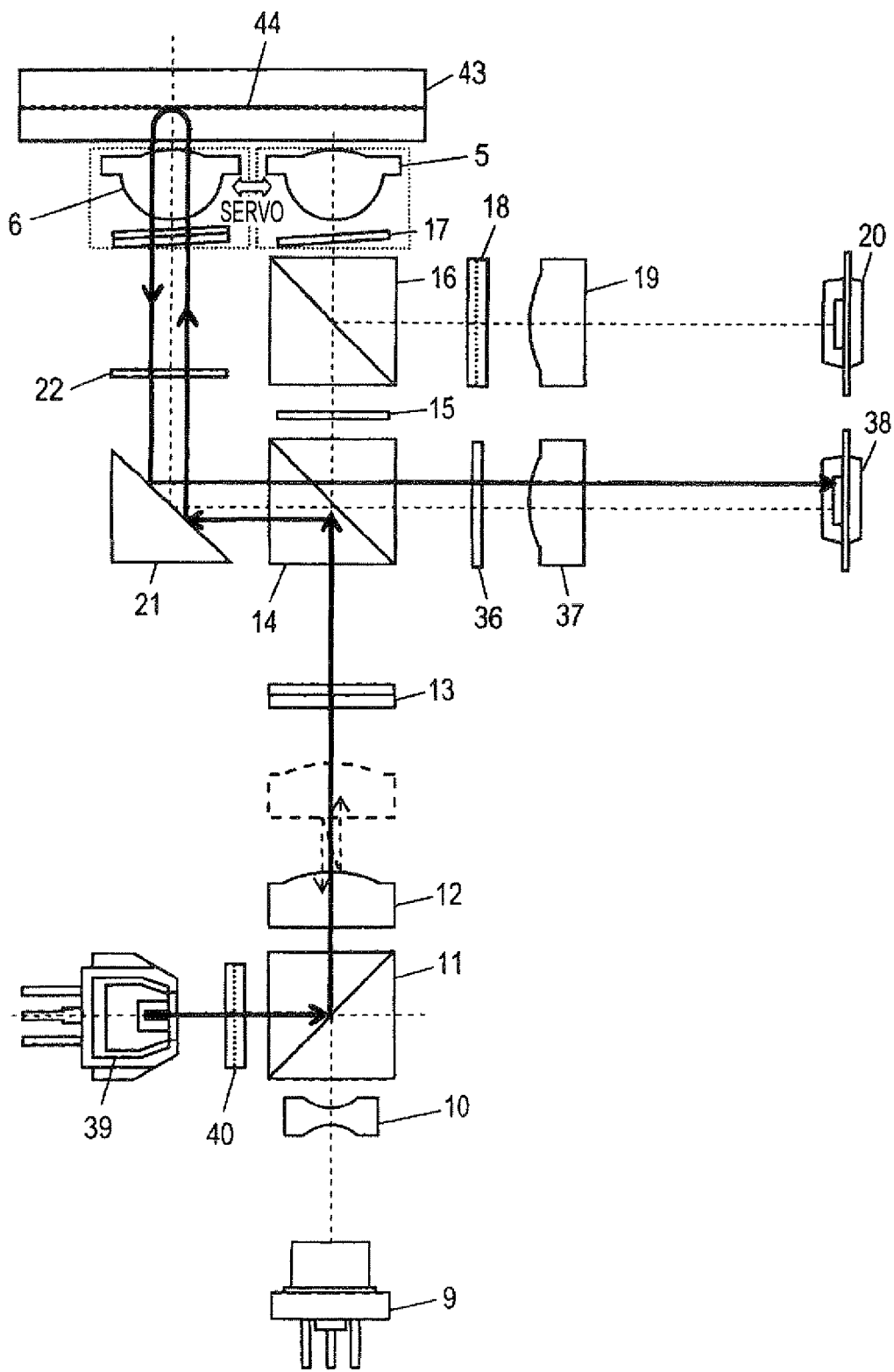
FIG. 8 is a block diagram for describing operation of the principal portion.
Figure 9:
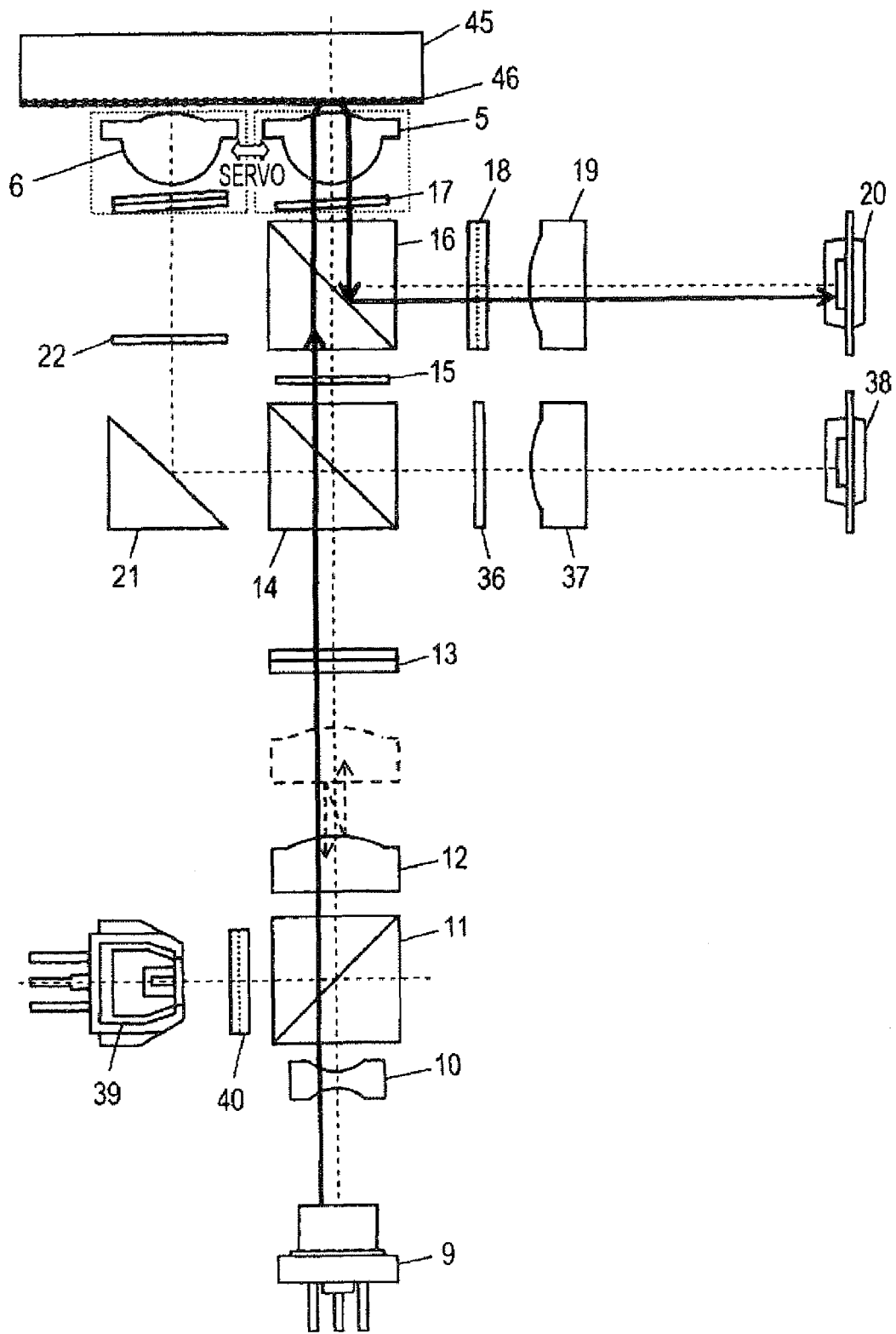
FIG. 9 is a block diagram for describing operation of the principal portion.

Since the CD 41, the DVD shown in FIG. 8, or a BD (Blu-ray Disc) shown in FIG. 9 also has address information in the data 42, it is possible to simultaneously perform checking of an address and writing or reading of information in or from the address. The data read during reproduction are supplied to the light receiving element 38.

FIG. 8 shows recording and reproducing of information in and from a DVD 43. In contrast with the CD 41 shown in FIG. 7, the light source 39 emits red light, to thus write data 44 in a recording plane provided in the vicinity of an intermediate plane of the DVD 43 in its thicknesswise direction or read the data 44 from the recording plane in the vicinity of the intermediate plane. Specifications unique to the DVD 43 include provision of the diffraction grating 40 for separating the red light from the light source 39 into three beams. However, the specifications correspond to a well-known technique, and hence their explanations are omitted.

Writing of the data 44 into the DVD 43 and detection of reading of the data 44 performed by the light receiving element 38 are also performed along the same path as that by unit of which the data are read and recorded from and in the CD 41 and also correspond to the well-known technique, and hence their explanations are omitted. FIG. 9 shows recording and reproducing of data 46 in and from a BD 45.

At this time, blue light emitted from the light source 9 is guided by way of the address detection lens 5, as shown in FIG. 9, whereby data 46 are recorded in a recording plane provided in the vicinity of a lower surface of the BD 45 in its thicknesswise direction.

The recorded data 46 are similarly read by way of the address detection lens 5 and detected by way of the address detection element 20.

In the present embodiment, the recording reproduction apparatus capable of elaborately recording and reading information in and from the multilayer recordable recording medium 1 exhibits compatibility that also allows recording and reproducing of data in and from the CD 41, the DVD 43, and the BD 45.

In the present embodiment, a blue light source is used for recording interference fringes of the recording medium 1. However, as a matter of course, recording can also be performed by use of a red light source, and the color (wavelength) of the light source used at the time of recording operation can be selected as appropriate.

Characteristic points of the present invention will hereinbelow be described. The characteristic points may also be utilized in combination or independently.

First, one of the characteristic points of the embodiment is that light whose center axis is made hollow is fed from the reference-light-side recording reproduction lens 6 to the recording medium 1 during reproduction. The characteristic point is described in detail by reference to FIG. 10.

Figure 10:
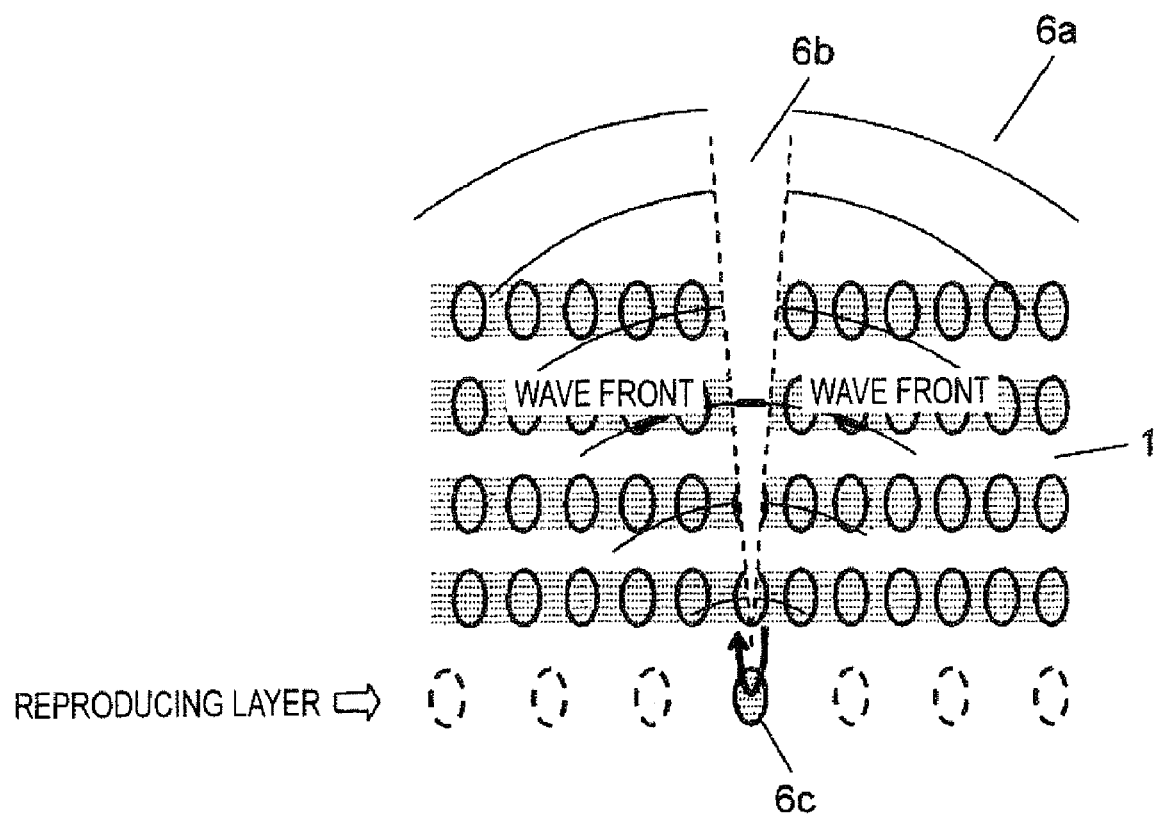
FIG. 10 is a block diagram for describing operation of the principal portion.

Specifically, as shown in FIG. 10, a center axis portion of light 6a radiated from the reference-light-side recording reproduction lens 6 onto the recording medium 1 is in a hollow light state 6b.

In FIG. 10, for instance, 100 layers of the recording medium 1 are assumed to be subjected to recording, and an attempt is now being made to perform reproducing operation by unit of reading an interference fringe 6c of the $50^{th}$ layer.

Specifically, during reproducing operation, the light 6a whose center axis portion is in the hollow light state 6b is fed from the reference-light-side recording reproduction lens 6 to the 50$^{th}$ layer of the recording medium 1.

As shown in FIG. 10, the light 6a supplied to the recording medium 1 assumes the shape of circumferential light (toroidal light) whose center is blocked.

Since an interference fringe 6c is present in the 50$^{th}$ layer at this time, the light reflected from the interference fringe 6c travels toward the reference-light-side recording reproduction lens 6 as depicted by a concentric line of FIG. 10 and is finally received by the light receiving element 38 described by use of FIG. 6, whereupon reproduction is carried out.

Even when the interference fringe 6c is present in the 50$^{th}$ layer during reproduction, another interference fringe is sometimes present in a part of the recording medium facing the reference light side recording reproduction lens 6; namely, the first through 49$^{th}$ layers on the lens side.

If the center axis portion of the light 6a supplied to the recording medium 1 is not hollow, a wave front of the light 6a will become parallel to the interference fringe at the center axis portion of the light. If an interference fringe is present in the first through 49$^{th}$ layers close to the viewer, great reflection will develop from the interference fringe. Since the wave front of the light 6a assumes a spherical shape outside the center axis portion, the wave front of the light 6a and the interference fringe become non-parallel to each other, and great reflection does not arise.

However, in the present embodiment, the light 6a whose center axis portion is an optical hollow 6b is supplied. Hence, the amount of light reflected from the interference fringe on the center axis of the light 6a in the first through 49$^{th}$ layers on the lens side becomes considerably small. Therefore, even if the reflected light is mixed into the light reflected from the 50$^{th}$ layer that is the target, the light does not become noise that hinders recording and reproducing of information in and from the 50$^{th}$ layer. As a consequence, reproduction of information recorded in layers becomes stable.

Since the wave front of the light 6a assumes a spherical shape, the wave front of the light 6a becomes non-parallel with the interference fringe at a point other than the center axis of the light, so that great reflection does not arise. Therefore, as mentioned above, the center axis portion is made so as to create the optical hollow 6b.

In the present embodiment, since the light 6a whose center axis portion is the optical hollow 6b is supplied to the recording medium 1 from the reference-light-side recording reproduction lens 6, an optical filter (not shown) is provided on a part of the reference-light-side recording reproduction lens 6 facing the light source 9.

The optical filter is configured in such a way that an area of the filter corresponding to the center portion of the reference-light-side recording reproduction lens 6 becomes optically opaque during reproduction.

By merely transforming the area of the optical filter corresponding to the center area of the reference-light-side recording reproduction lens 6 to an optically opaque area during reproduction as mentioned above, it becomes possible to readily supply the recording medium 1 with the light 6a whose center axis portion has come into the optical hollow 6b.

As a matter of course, the optical filter is configured so as to become optically transparent as a whole during recording, whereby a decrease in energy, which would otherwise arise during recording, is prevented.

Moreover, when consideration for a decrease in energy, which would arise during recording operation, is not necessary, an optically opaque area can also be made directly at the center of the part of the reference-light-side recording reproduction lens 6 facing the recording medium 1 or the center of a part of the reference-light-side recording reproduction lens 6 facing the spherical aberration correction element 23.

In FIG. 10, light reflected from the interference fringe 6c of the 50$^{th}$ layer travels to the reference-light-side recording reproduction lens 6 as depicted by a concentric line of FIG. 1 in the manner as mentioned above. As a matter of course, the reflected light travels through the optical hollow 6b in a concentric fashion. However, in order to avoid complication of FIG. 10, concentric lines are not provided in the optical hollow 6b.

Another characteristic point of the present embodiment is the speed of response achieved when vibrations have arisen in the recording medium 1 and will be hereunder described in detail.

Vibrations arise in the recording medium 1 when external kinetic energy (a physical impact) has exerted on the recording medium 1, when the recording medium 1 itself becomes slightly curved (wavy) from a plane state, and the like. Even in this case, in the present embodiment, the address 8 of the recording medium 1 is first read, and recording and reproducing operations are continually performed.

As mentioned above, in the present embodiment, the positional information about the address detection lens 5 serves as a reference. Focal points of the recording reproduction lenses 6 and 7 are controlled at all times by reference to the positional information about the address detection lens 5.

Therefore, even when vibrations have arisen in the recording medium 1, focal point information about the address detection lens 5 with respect to the address 8 of the recording medium 1 is first detected in accordance with the information arrived at the address detection element 20.

Figure 3:
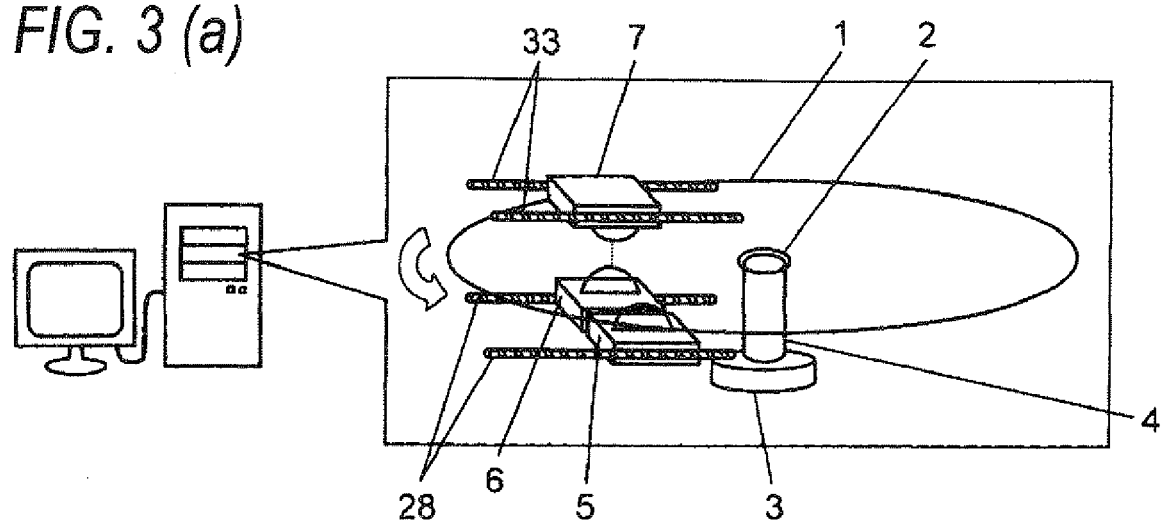
FIG. 3A is an enlarged perspective view of the same principal portion.
FIG. 3B is an enlarged plan view of the principal portion.
Figure 3:
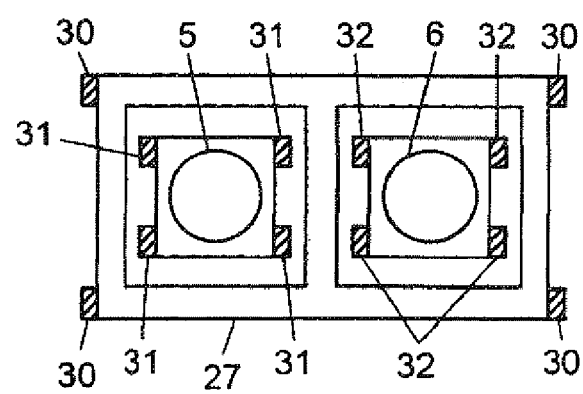

The focal point information is first transmitted to circuitry that drives the electromagnetic coils 30 shown in FIG. 3, whereby the distance between the recording medium 1 and the address detection lens 5 and the recording medium 1 and the recording reproduction lens 6 are roughly adjusted for each frame 27.

Specifically, the address detection lens 5 and the recording reproduction lens 6 are combined into a single unit on the frame 27 in the present embodiment, whereby the address detection lens 5 and the recording reproduction lens 6 can be roughly, stably adjusted with respect to the recording medium 1 within a short period of time.

The distance between the recording medium 1 and the address detection lens 5 and the distance between the recording medium 1 and the recording reproduction lens 6 are finely adjusted by unit of applying power to the electromagnetic coils 31 and 32 respectively provided at the four corners of the address detection lens 5 and the recording reproduction lens 6 in accordance with information about the position of the address detection lens 5 with respect to the address 8 of the recording medium 1 which has been detected by the address detection element 20.

In the present embodiment, before completion of fine adjustment of the address detection lens 5, information about focal point adjustment performed by the electromagnetic coil 31 (first focal point adjustment unit) by reference to the address detection lens 5; namely, the direction of a current and its magnitude, is supplied in advance as control information to circuitry for driving the electromagnetic coils 32 (second focal point adjustment unit) that adjust a focal point of the recording reproduction lens 6.

Before completion of positional adjustment of the address detection lens 5, a direction of adjustment and a required extent of adjustment are transmitted to the recording reproduction lens 6 (circuitry for driving the electromagnetic coils 32). Therefore, adjustment can be commenced as soon as possible.

Even when vibrations have arisen in the recording medium 1, distances of the address detection lens 5 and the recording reproduction lenses 6 and 7 can appropriately be adjusted in agreement with the vibrating recording medium 1. As a consequence, quick response and enhancement of recording and reproducing reliability can be achieved.

One of the characteristics of the present embodiment is that information is sequentially recorded from a lower layer to an upper layer when recorded in multiple layers in the thicknesswise direction of the recording medium 1.

Therefore, put another way, a great characteristic of the present embodiment lies in that, when information is recorded in multiple layers in the thicknesswise direction of the recording medium 1, information is sequentially recorded from the reference light entrance side to the recording light entrance side as shown in FIG. 2.

As mentioned above, in the present embodiment, recording and reproducing of information in and from the recording medium 1 are considerably stably performed. Therefore, as mentioned above, a great characteristic of the present embodiment lies in that, when information is recorded in multiple layers in the thicknesswise direction of the recording medium 1, information is sequentially recorded from below to up in FIG. 2.

Light emitted from the recording reproduction lens 6 to the recording medium 1 is called reference light. Further, the light emitted to the recording medium 1 by way of the recording reproduction lens 7 after undergoing reflection on the retro-reflector 26 is called recording light. Put another way, a great characteristic of the present embodiment lies in that, when information is recorded in multiple layers in the thicknesswise direction of the recording medium 1, information is sequentially recorded from the reference light entrance side to the recording light entrance side as shown in FIG. 2.

An advantage, which will be yielded as a result of information being sequentially recorded from the reference light entrance side to the recording light entrance side, is now described.

Figure 11:
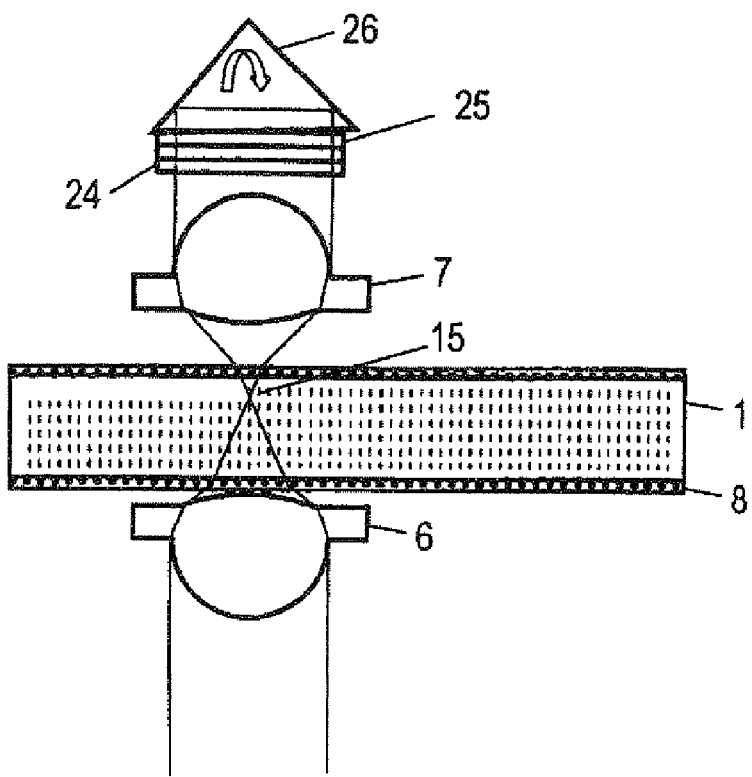
FIG. 11A is a block diagram showing an embodiment.
FIG. 11B is a block diagram showing a comparative example against the present embodiment.
Figure 11:
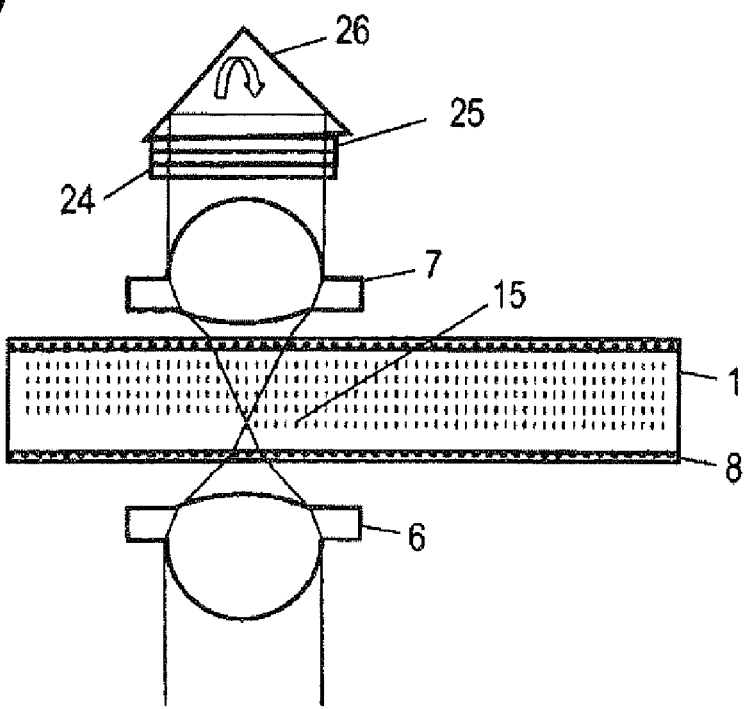

FIG. 11A shows the embodiment of the present invention in which information is sequentially recorded in multiple layers from the reference light side (the recording reproduction lens 6) toward the recording light side (the recording reproduction lens 7).

FIG. 11B shows a comparative example for the present invention in which information is sequentially recorded in multiple layers from the recording light side (the recording reproduction lens 7) toward the reference light side (the recording reproduction lens 6).

First, the problem of the comparative example is described by reference to FIG. 11B.

As shown in FIG. 11B, when information is sequentially recorded in multiple layers from the recording light side (the recording reproduction lens 7) toward the reference light side (the recording reproduction lens 6), information is recorded in layers while the existing interference fringe 15 is not in existence at a point of generation of an interference fringe from the viewpoint of reference light.

However, during reproducing operation subsequent to completion of recording operation, only the reference light enters the recording medium 1, and the interference fringe 15 is read as one set of digital data by unit of the reference light. When an attempt is made to read information from; for instance, the interference fringe 15 that is the tenth layer from the bottom, the interference fringes 15 of the first through ninth layers are present below the tenth layer. Information must be read from the interference fringe 15, which is the tenth layer from the bottom, under such a circumstance.

Even when information is read from the interference fringe 15 of the same layer, reading must be performed in a state differing from that achieved during writing operation, from the viewpoint of the reference light employed during reproduction. Reading becomes unstable for this reason, and reproduction naturally becomes unstable.

In contrast, in the embodiment of the present invention shown in FIG. 11A, information is sequentially recorded in multiple layers from the reference light side (the recording reproduction lens 6) toward the recording light side (the recording reproduction lens 7). From the viewpoint of the reference light, the state achieved at the point of generation of interference fringe remains unchanged in both recording and reproducing operations.

In a case where information is recorded in; for instance, the tenth layer from the bottom, when an attention is paid to the reference light entered the recording medium 1, the previously-recorded interference fringes 15 of the first through ninth layers located below the tenth layer still exist in an optical path for the reference light traveling toward a point in the recording medium 1 where the reference light interferes with the recording light.

Even in a reproducing operation for reading information from; for instance, the tenth layer from the bottom, the interference fringes 15 of the first through ninth layers located below the tenth layer still exist in the optical path for the reference light. From the viewpoint of reference light achieved during reproduction, the state of the optical path remains unchanged at all in both the recording and reproducing operations. Reading operation can stably be performed, and reproduction consequently becomes stable.

This is the greatest characteristic of the present embodiment. In order to enhance an effect of the characteristic, the present embodiment adopts a configuration in which a write complete signal is written in every layer on a recording plane of the recording medium 1.

In order to achieve a totally unchanged state of the optical path in both recording and reproducing operations for the reference light as mentioned above, a write complete signal is written in the first layer when the recording plane is switched to a higher layer (e.g., the second layer on the part of the recording medium facing the recording reproduction lens 7).

The reason for this is as follows. An assumption is made that switching is made to the second layer while a recording area of the first layer is still empty and recording is performed and that an attempt is made to again record information in the empty recording area after realization of existing vacancy of the recording area on the first layer. Under such an assumption, even when a lot of efforts are made to achieve for the reference light the totally unchanged state of the optical path in both the recording and reproducing operations, the state of the optical path for the reference light comes to change between the recording operation and the reproducing operation at a point in the interference fringe 15 of the second layer overlapping a subsequently-recorded area on the first layer.

For these reasons, the present embodiment adopts a configuration in which a write complete signal is written in every layer of the recording plane on the recording medium 1. By unit of the configuration, the state of the optical path is totally unchanged for the reference light in both the recording and reproducing operations. Therefore, reading operation can stably be performed, as a consequence of which reproducing operation becomes stable.

One of the characteristic points of the present embodiment lies in that the diameter of the focal point made by the recording-light-side recording reproduction lens 7 is made greater than the diameter of the focal point made by the reference-light-side recording reproduction lens 6.

Figure 12:
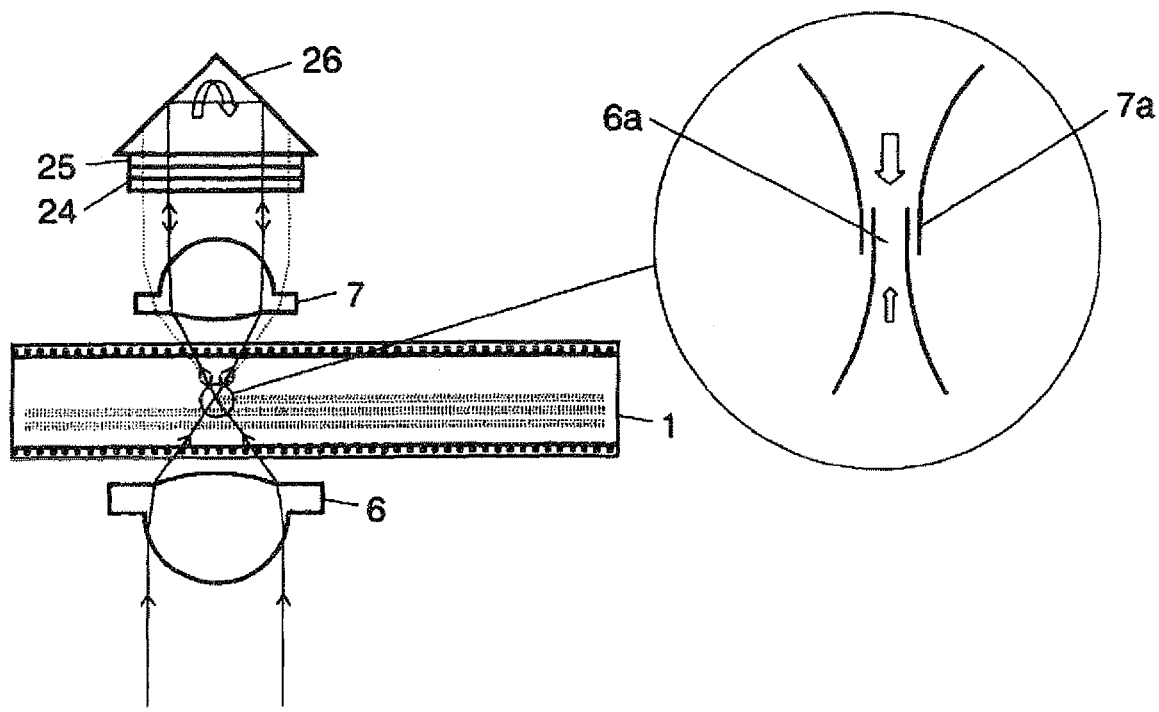
FIG. 12 is a block diagram for describing operation of the principle portion.

Specifically, as shown in FIG. 12, the diameter of the recording reproduction lens 7 is made smaller than the diameter of the recording reproduction lens 6, whereby a diameter 7a of the focal point of the recording-light-side recording reproduction lens 7 is made larger than a diameter 6a of the focal point of the reference-light-side recording reproduction lens 6 (i.e., an NA of the recording reproduction lens 7 is made smaller than an NA of the recording reproduction lens 6) as shown on the right side of FIG. 12.

Therefore, a point of intersection is made over a wider range by unit of the focal points of the recording reproduction lenses 6 and 7, so that stable interference fringes can thereby be generated.

To begin with, the recording reproduction lenses 6 and 7 oppose each other with the recording medium 1 sandwiched therebetween; in other words, the recording reproduction lenses are separate from each other. It is therefore considerably difficult to let the focal points coincide with each other at all times. For this reason, in the present embodiment, the diameter 7a of the focal point of the recording-light-side recording reproduction lens 7 is made greater than the diameter 6a of the focal point of the reference-light-side recording reproduction lens 6 as mentioned above. As a consequence, the focal points of the recording reproduction lenses 6 and 7 are stably made at a point of intersection, so that stable interference fringes can be generated.

More detailed explanations are now provided to the reason why the diameter 7a of the focal point of the recording-light-side recording reproduction lens 7 is made greater than the diameter 6a of the focal point of the reference-light-side recording reproduction lens 6. The recording reproduction lens 6 is combined with the address detection lens 5 in a single unit as mentioned above, and the position of the recording reproduction lens 6 is easy to manage, in contrast, the recording reproduction lens 7 is a separate element that is disposed opposite the recording reproduction lens 6 with the recording medium 1 interposed therebetween. Therefore, an increase in the diameter 7a of the focal point of the recording reproduction lens 7 makes it easy to cause the focal points of the recording reproduction lenses 6 and 7 coincide with each other at all times as shown in FIG. 12.

In conclusion, by unit of such a contrivance, the focal points of the recording reproduction lenses 6 and 7 stably make a point of intersection in a target recording layer within the recording medium 1, and a stable interference fringe can be generated at the point of intersection.

With regard to the configuration for making the diameter 7a of the focal point of the recording-light-side recording reproduction lens 7 greater than the diameter 6a of the focal point of the reference-light-side recording reproduction lens 6, there is mentioned a configuration in which an optically opaque area is made along an outer edge of the recording reproduction lens 7 or a proximity thereof; for instance, an outer edge portion of the spherical aberration correction element 24.

Even in this case, an effective diameter of the recording reproduction lens 7 can be made small, and hence the same advantage as that yielded in the embodiment shown in FIG. 12 is acquired.

One of the characteristic points of the present embodiment is that recording layers are offset from each other, which will be described by reference to FIGS. 13 through 15.

Figure 13:
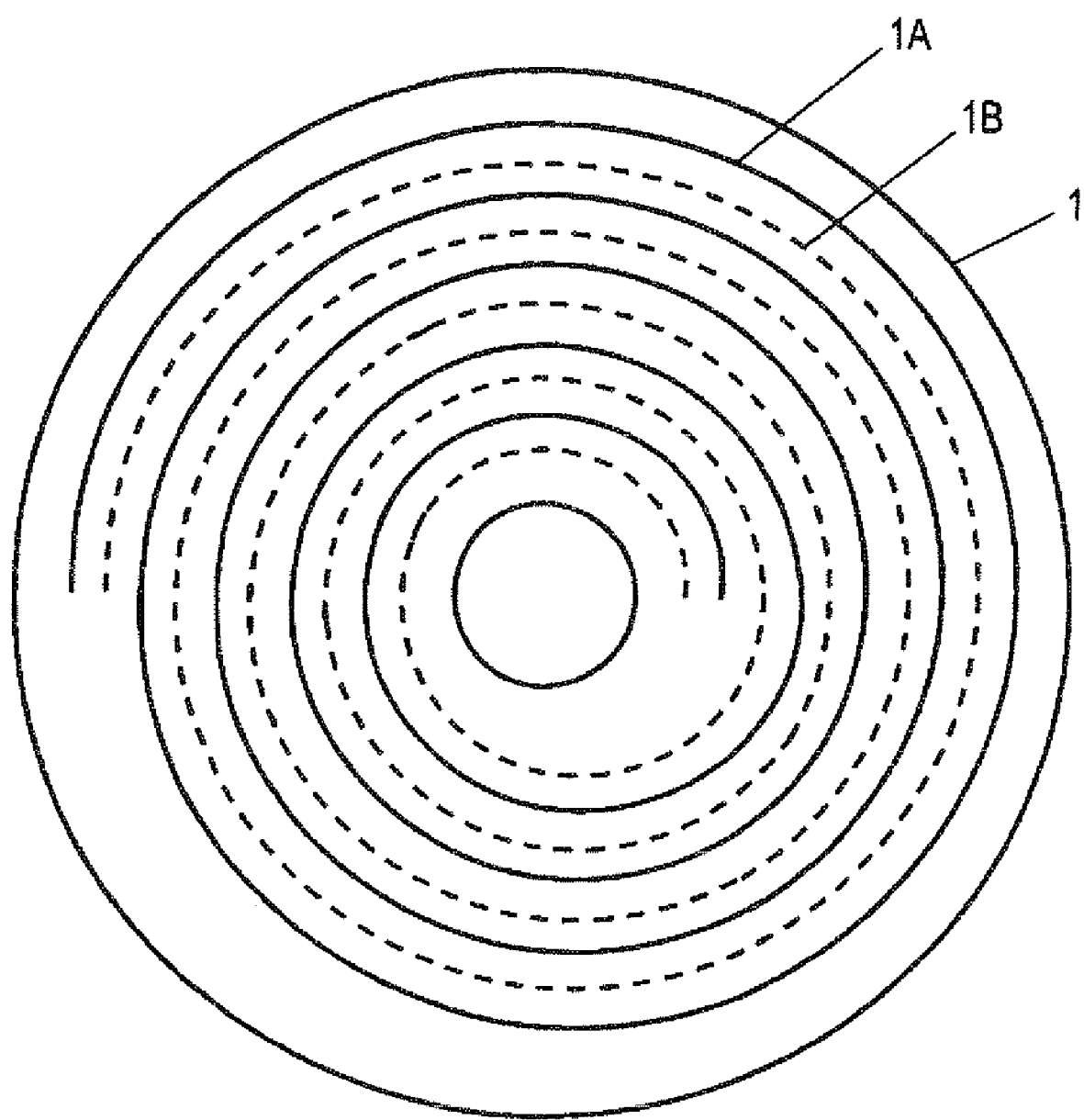
FIG. 13 is a plan view of a recording medium for describing operation of the principle portion.
Figure 14:
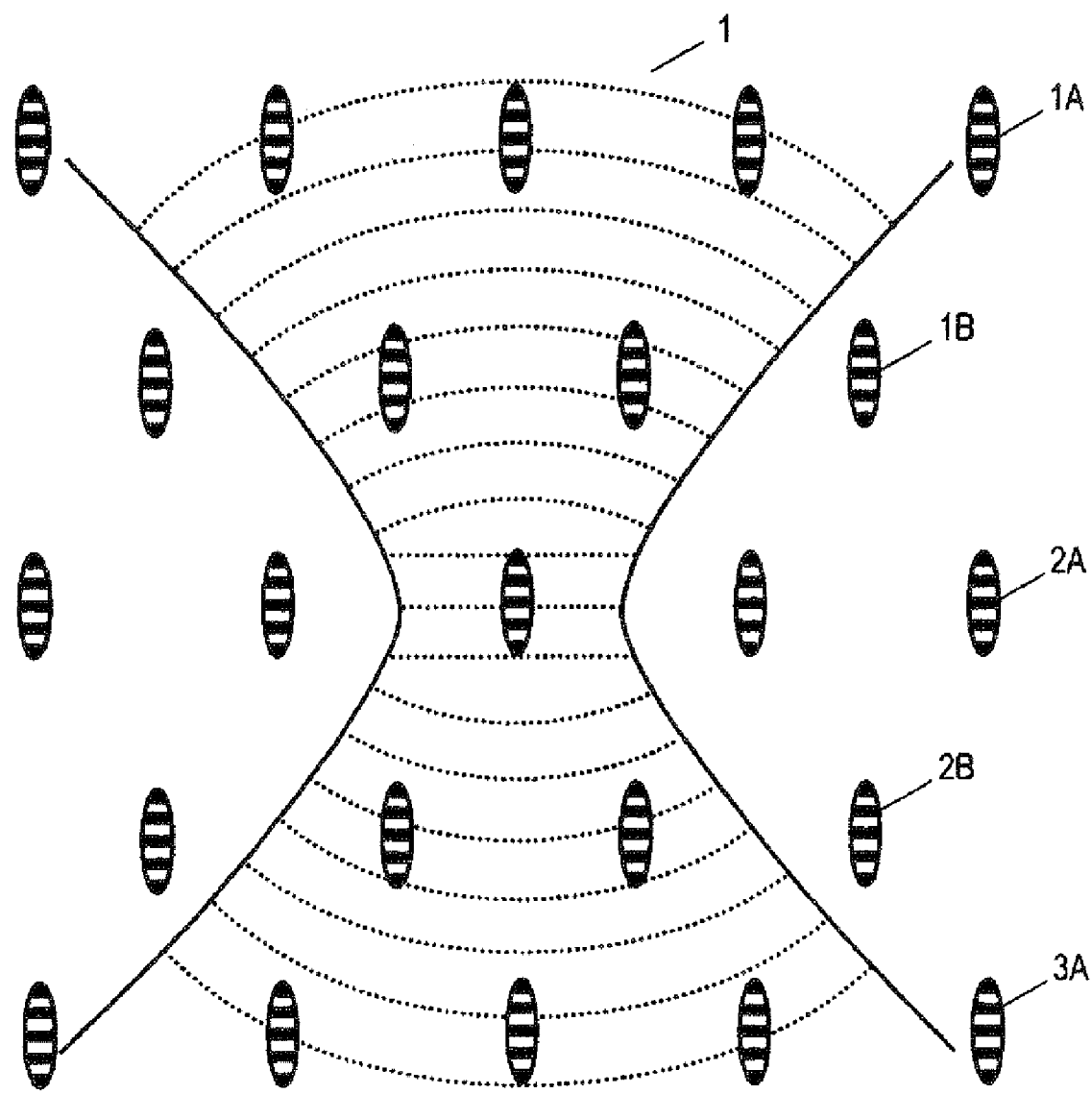
FIG. 14 is an enlarged cross-sectional view of a recording medium for describing operation of the principle portion.

In the present embodiment, as shown in FIGS. 13 and 14, information is recorded in; for instance, 100 layers, in the multilayer recordable recording medium 1.

Specifically, the recording medium 1 assumes the shape of a disc as shown in FIG. 13. Data are recorded at a predetermined interval in a total of 100 layers from the front to back of the recording medium; namely, layers 1A to 50A and layers 1B to 50B, by unit of interference fringes resultant from optical interference developing at a point of intersection of light beams from the recording reproduction lenses 6 and 7 as mentioned above. The data make up portions of a digital signal. In one plane (in an interior layer) where interference fringes are generated, a video and audio are recorded as a digital signal as a result of intermittent generation of an interference fringe.

Under such a circumstance, in the present embodiment, data in recording layers, which are adjacent to each other in a front-to-back direction of the recording medium 1, among the plurality of recording layers 1A to 50A and 1B to 50B provided at a predetermined interval between the front and back surfaces of the recording medium 1; for instance, data in a recording layer 1B shown in FIG. 14, data in a recording layer 1A located above the layer 1B, and data in a recording layer 2A located below the layer 1A, are offset from each other in a direction orthogonal to the front-to-back direction of the recording medium 1.

Therefore, when the recording medium 1 is viewed from the front side (from the top surface side), data in the recording layer 1A and data in the recording layer 1B are offset from each other in a direction orthogonal to the front-to-back direction of the recording medium 1 (this state is represented also as a state in which a data-recorded track in the recording layer 1A and a data-recorded track in the recording layer 1B are offset from each other in a direction orthogonal to the front-to-back direction of the recording medium 1).

Descriptions are now provided from the viewpoint of data reading. As shown in FIG. 14, only one piece of data of the recording layer 2A exists in a beam waist (an area where wave fronts of light become substantially parallel to each other) of the light from the recording reproduction lens 6. Therefore, only one piece of data can be read, and reliability of reading is consequently enhanced.

In FIG. 14, an optical point of intersection travels from a point close to the viewer to a deep inside of the drawing. Data that are present on both sides of the data in the beam waist of light are data located in adjacent tracks on the recording layer 2A.

Data in the adjacent recording layer 1B and data in the recording layer 2B exist above and below the beam waist of light. In this data area, the wave fronts of light arrive at the sets of data at an inclination as shown in FIG. 14 and hence there is not achieved a situation in which the data are appropriately read by the recording reproduction lens 6. Accordingly, even in this point of view, only one piece of data in the beam waist of light from the recording reproduction lens 6 can appropriately be read. As a consequence, reading reliability is enhanced.

Figure 15:
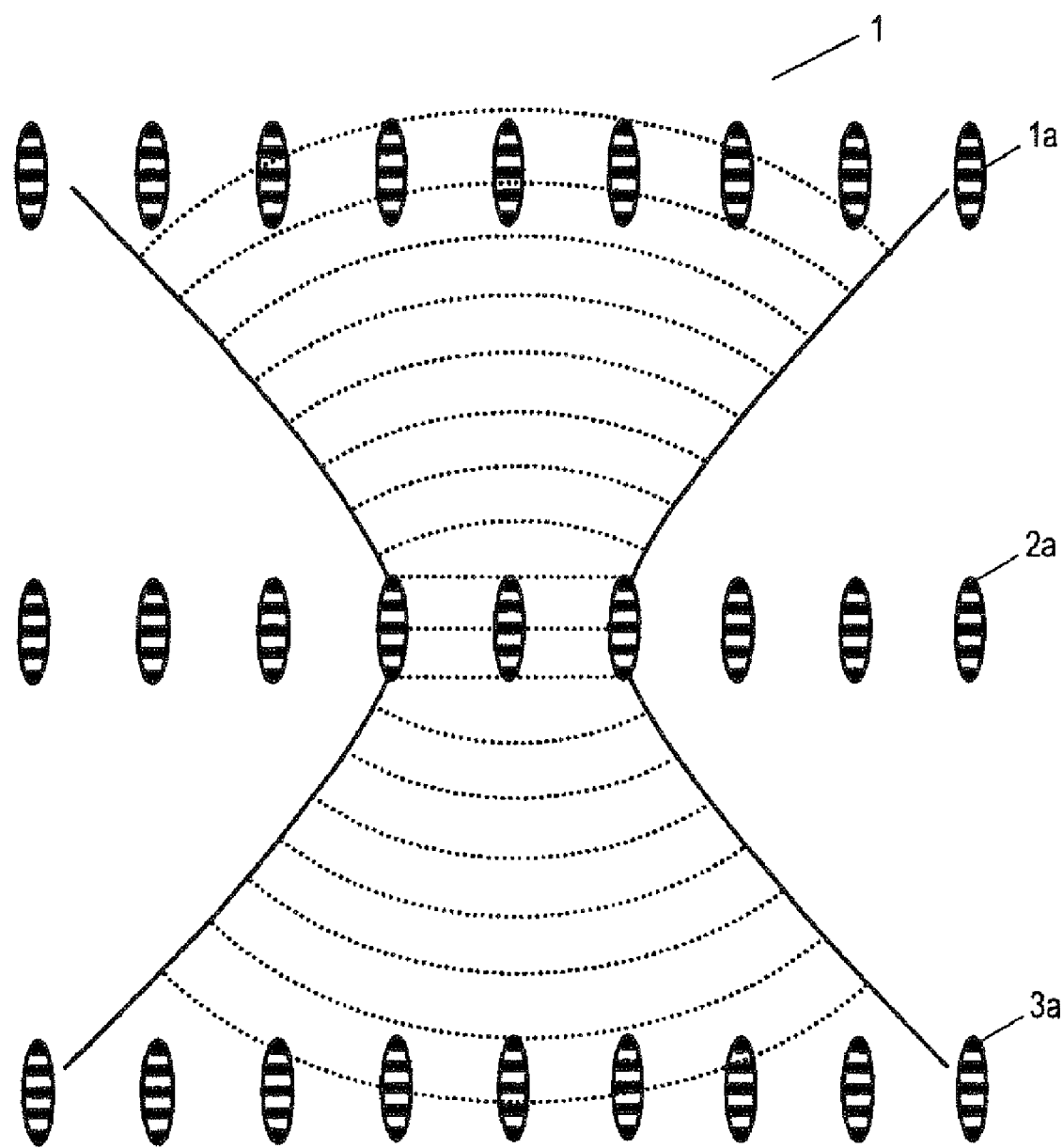
FIG. 15 is an enlarged cross-sectional view of the comparative example used for describing operation of the principle portion.

FIG. 15 shows a comparative example of the embodiment. In the example, data in the recording layers 1a to 3a vertically overlap each other. Specifically, in order to enhance recording density in the respective recording layers 1a to 3a, data are densely recorded in the recording layers 1a to 3a.

Therefore, no fewer than three pieces of data in the recording layer 2a exist in the beam waist of the light from the recording reproduction lens 6. In such a situation, data in the backs on both sides are also read, whereby reading reliability is deteriorated.

For this reason, there is also a conceivable measure to skip data on both sides among the three pieces of data in the area of the recording layer 2a corresponding to the beam waist of the light from the recording reproduction lens 6 in connection with the comparative example shown in FIG. 15. However, a data skip results in deterioration of reading reliability of the recording medium 1.

In the present embodiment, the recording layers 1B to 50B are therefore provided between the recording layers 1A to 50A, thereby avoiding a decrease in the quantity of data.

In the present embodiment, data in the recording medium 1 can be three-dimensionally arranged more efficiently than are data in the comparative example. The recording capacity of the recording medium 1 can be increased as compared with that of the comparative example by optimizing the distance between tracks and the distance between recording layers.

In FIGS. 14 and 15, spaces between the recording layers 1A, 1B, 2A, 2B, and 3A are drawn so as to become even in the front-to-back direction (a thicknesswise direction) of the recording medium 1 in consideration of ease of descriptions. In reality, the recording layer 1A and the recording layer 1B, the recording layer 2A and the recording layer 2B, . . . , and the recording layer 50A and a recording layer 50B are in close proximity to each other. Conversely, the recording layer 1B and the recording layer 2A, the recording layer 2B and the recording layer 3A, . . . , and a recording layer 49B and the recording layer 50A are greatly separated from each other, whereby an increase in the number of recording layers in the recording medium 1 is prevented.

Even when the recording layer 1A and the recording layer 1B, the recording layer 2A and the recording layer 2B, . . . , and the recording layer 50A and the recording layer 50B are in close proximity to each other, data in the recording layer 1A and data in the recording layer 1B are offset to each other in a direction orthogonal to the front-to-back direction of the recording medium 1 (this state is also represented as a state in which a data-recorded track in the recording layer 1A and a data-recorded track in the recording layer 1B are offset from each other in a direction orthogonal to the front-to-back direction of the recording medium 1) as shown in FIG. 13. Hence, as shown in FIG. 14, only one piece of data of the recording layer 2A is present in a beam waist of the light from the recording reproduction lens 6. Therefore, only the one piece of data can be read, as a consequence of which reading reliability is enhanced.

Even when the recording layer 1A and the recording layer 1B, the recording layer 2A and the recording layer 2B . . . , and the recording layer 50A and the recording layer 50B are made close to each other, data in the recording layer 1A and data in the recording layer 1B (the same also applies to data in the recording layer 2A and data in the recording layer 2B, . . . , and data in the recording layer 50A and data in the recording layer 50B) are preferably not to overlap each other in the front-to-back direction (the thicknesswise direction) of the recording medium 1.

The above descriptions are given to reading of data; namely, reproduction of data. However, recording operation can appropriately be performed for the same reason during recording operation, and recording reliability is enhanced.

Namely, even in recording operation, only one piece of data is recorded at the point of intersection of the light beams from the recording reproduction lenses 6 and 7; hence, recording is appropriately performed, and recording reliability is enhanced.

In the present embodiment, the recording reproduction lenses 6 and 7 are disposed opposite each other with the recording medium 1 interposed therebetween. However, it may also be possible to provide only the recording reproduction lens 6, to record interference fringes in the recording medium 1 beforehand, and to extinguish the interference fringes, to thus perform recording operation.

As mentioned above, the recording reproduction apparatus of the present invention is capable of recording and reproducing a considerably massive amount of elaborate information, and also exhibits highly stable operation. Therefore, the recording reproduction apparatus is widely utilized in various fields where an increase in recording capacity is sought. So long as the recording reproduction apparatus can perform recording and reproducing of a massive quantity of elaborate information, labor, which will be consumed by replacement of a recording medium, is saved, which in turn provides considerably superior convenience.

This application claims the benefit of Japanese Patent application No. 2008-221387 filed on Aug. 29, 2009, Japanese Patent application No. 2008-221390 filed on Aug. 29, 2009, Japanese Patent application No. 2008-221391 filed on Aug. 29, 2009, Japanese Patent application No. 2008-221395 filed on Aug. 29, 2009, Japanese Patent application No. 2008-221396 filed on Aug. 29, 2009, Japanese Patent application No. 2008-221398 filed on Aug. 29, 2009, the entire contents of which are incorporated herein by reference.

What is claimed is:

1. A recording and reproducing apparatus comprising:
    a rotary drive unit rotationally driving a multilayer recordable recording medium;
    a recording and reproducing lens disposed oppositely to the recording medium that is rotationally driven by the rotary drive unit;
    a light source for emitting light to the recording and reproducing lens; and
    an optical filter provided at a position between the recording and reproducing lens and the light source,
    wherein the optical filter makes a center axis portion of the optical filter opaque during a reproduction operation and makes the optical filter transparent as a whole during a recording operation.

2. The recording and reproducing apparatus according to claim 1, further comprising:
    an address detection lens disposed oppositely to the recording medium and provided separately from the recording and reproducing lens; and
    an address light source supplying address light to the address detection lens.

3. The recording and reproducing apparatus according to claim 1, wherein the recording and reproducing lens is comprised of a first recording and reproducing lens disposed on the recording-reproducing-light-source side of the recording medium and a second recording and reproducing lens disposed on another side of the recording medium opposite to the recording-reproducing-light-source side.

4. The recording and reproducing apparatus according to claim 1, wherein an area of the optical filter that corresponds to a center portion of the recording and reproducing lens is provided with an optically opaque portion, and the optical filter is combined integrally with the recording and reproducing lens.

5. The recording and reproducing apparatus according to claim 2, wherein the recording and reproducing lens and the address detection lens are provided within a frame.

6. The recording and reproducing apparatus according to claim 5, wherein the frame is provided with a frame drive unit that actuates the frame in a radial direction of the recording medium.

7. The recording and reproducing apparatus according to claim 2, further comprising:
   a first lens distance adjustment unit adjusting a distance between the recording and reproducing lens and the recording medium; and
   a second lens distance adjustment unit adjusting a distance between the address detection lens and the recording medium.

8. The recording and reproducing apparatus according to claim 5, further comprising:
   a lens position correction unit for adjusting a position of the recording and reproducing lens and a position of the address detection lens within the frame.

9. The recording and reproducing apparatus according to claim 8, wherein the lens position correction unit corrects the positions of the recording and reproducing lens or the position of the address detection lens within the frame by a change in capacitance of capacitors fabricated in the frame.

10. The recording and reproducing apparatus according to claim 9, wherein an outer square frame of the recording and reproducing lens and an outer square frame of the address detection lens are provided within the frame, and respective side faces of each of the outer frames provide capacitor electrodes.

11. The recording and reproducing apparatus according to claim 5, wherein the address detection lens and the recording and reproducing lens are disposed, side by side in the frame, at an upstream position and a downstream position along track-like addresses of the recoding medium.

12. The recording and reproducing apparatus according to claim 5, wherein the address detection lens and the recording and reproducing lens are arranged within the frame along a radial direction of the recording medium.

13. The recording and reproducing apparatus according to claim 3, further comprising a light receiving element for detecting a displacement between a focal point of the first recording and reproducing lens and a focal point of the second recording and reproducing lens.

14. The recording and reproducing apparatus according to claim 2, wherein a wavelength of the address light source is made equal to or shorter than a wavelength of the recording and reproducing light source.

15. The recording and reproducing apparatus according to claim 2, wherein the recording and reproducing light source and the address light source are commoditized.

16. The recording and reproducing apparatus according to claim 1, wherein security information is supplied to the recording and reproducing light source.

* * * * *